US012222093B1

(12) United States Patent
Qiu

(10) Patent No.: US 12,222,093 B1
(45) Date of Patent: Feb. 11, 2025

(54) LONGITUDINALLY GRIPPING LIGHT DEVICE, FOCUS ADJUSTABLE PISTOL TYPE SPOTLIGHT AND SWIVEL HOOK PISTOL LIGHT

(71) Applicant: NINGBO FUTAI ELECTRIC LIMITED, Zhejiang (CN)

(72) Inventor: Fujun Qiu, Zhejiang (CN)

(73) Assignee: NINGBO FUTAI ELECTRIC LIMITED, Ningbo (CN)

( * ) Notice: Subject to any disclaimer, the term of this patent is extended or adjusted under 35 U.S.C. 154(b) by 0 days.

(21) Appl. No.: 18/826,138

(22) Filed: Sep. 5, 2024

Related U.S. Application Data

(63) Continuation of application No. 18/531,645, filed on Dec. 6, 2023, now Pat. No. 12,123,580.

(51) Int. Cl.
*F21V 21/40* (2006.01)
*F21L 4/00* (2006.01)
*F21V 17/10* (2006.01)

(52) U.S. Cl.
CPC ............ *F21V 21/406* (2013.01); *F21L 4/005* (2013.01); *F21V 17/10* (2013.01)

(58) Field of Classification Search
CPC ....... F21V 21/40; F21V 21/406; F21V 14/005
See application file for complete search history.

(56) References Cited

U.S. PATENT DOCUMENTS

| | | | | | |
|---|---|---|---|---|---|
| 5,019,951 | A * | 5/1991 | Osterhout | F21V 21/406 | 362/399 |
| 5,349,512 | A * | 9/1994 | Parker | F21V 21/406 | 362/399 |
| 5,911,497 | A * | 6/1999 | Mele | F21L 2/00 | 362/202 |
| 6,027,226 | A * | 2/2000 | Shiau | F21V 9/083 | 362/186 |
| 2005/0007769 | A1* | 1/2005 | Bonzer | F21L 4/08 | 362/157 |
| 2005/0237742 | A1* | 10/2005 | Wang | F21V 33/004 | 362/253 |
| 2006/0158884 | A1* | 7/2006 | Kim | F21V 21/406 | 362/269 |
| 2006/0176688 | A1* | 8/2006 | Yuen | F21L 4/025 | 362/199 |
| 2008/0165550 | A1* | 7/2008 | Carmi | B60Q 1/245 | 362/183 |
| 2015/0252983 | A1* | 9/2015 | Lee | F21V 14/065 | 362/109 |
| 2017/0002997 | A1* | 1/2017 | Huang | F21V 5/008 | |
| 2022/0403988 | A1* | 12/2022 | Shen | F21V 21/30 | |

* cited by examiner

*Primary Examiner* — Zheng Song
(74) *Attorney, Agent, or Firm* — Ying-Ting Chen

(57) ABSTRACT

A focus adjustable pistol type spotlight includes a mounting main housing having a pistol shaped structure and at least one receiving cavity located therein, a light source assembly including at least one lighting subject body, and a lens assembly located on the exit path of the light source assembly, wherein at least one of the lighting subject bodies is mounted on the mounting main housing along an optical axis of the light source assembly in a movable manner such that the at least one of the lighting subject bodies moves relative to the lens assembly.

12 Claims, 30 Drawing Sheets

LONGITUDINALLY GRIPPING LIGHT DEVICE, FOCUS ADJUSTABLE PISTOL TYPE SPOTLIGHT AND SWIVEL HOOK PISTOL LIGHT

CROSS REFERENCE OF RELATED APPLICATION

This is a Continuation Application that claims the benefit of priority under 35U.S.C.§ 120 to a non-provisional application, application Ser. No. 18/531,645, filed Apr. 18, 2024, which is a non-provisional application that claims priority under 35U.S.C. § 119 to China application number CN202310064612.6, filing date Jan. 11, 2023, China application number CN202310438552.X, filing date Apr. 18, 2023, and China application number CN202321797473X, filing date Jul. 7, 2023, wherein the entire content of which is expressly incorporated herein by reference.

BACKGROUND OF THE PRESENT INVENTION

The present invention relates to a lighting equipment, and more particularly to a longitudinally gripping light device which is adapted to be longitudinal gripped for adjusting the lighting direction conveniently, a focus adjustable pistol type spotlight and a swivel hook pistol light.

DESCRIPTION OF RELATED ARTS

A lighting equipment is widely used in daily life, outdoor camping, night adventure or other scenarios, a typical portable light, such as a flashlight, includes a barrel and a light head provided at a front end of the barrel, when in use, the user needs to hold the barrel, and then adjusts the direction of the barrel to adjust a lighting direction of the light head.

However, when the user's hand is used to hold the barrel, the barrel is generally held horizontally by the user's hand, and a light head of the flashlight is exposed between a thumb and an index finger of the user's hand, so that the light emitted by the light head of the flashlight can be emitted into the environment. If the user holds the flashlight in his right hand, the rotation angle of the barrel to the right direction is limited, and if the user holds the flashlight in his or her left hand, the rotation angle of the barrel toward the left direction is limited. That is, the lighting direction of the light head cannot be adjusted at a large angle by the swing or rotation of the user's hand. Therefore, when the conventional flashlight adjusts the lighting direction of its light head, it needs to move the standing position of the human body or swing the entire arm to adjust the lighting direction of the flashlight in a large range, which is not convenient, and when the user's griping hand is moved to adjust the barrel of the flashlight to the required angle, the user's hand is also prone to fatigue and soreness when it is held in an offset holding position for a long time.

In addition, as the conventional flashlight cannot perform its own advantages in some usage environments, it causes the limitation of its functions. For example, when a movable lighting tool is needed to be used to provide a spot lighting to a certain area in a period of time, the conventional flashlight usually cannot be fixed at the certain area to produce the spot light due to the limitation of the structure. On the other hand, the conventional flashlight cannot be easily hung at a certain place to hold the light source in the air so as to produce the light projected from the top. The light source output of the conventional flashlight often needs the user himself or herself to hold the light source for stabilizing, the long-time holding cannot meet the needs of some use scenarios, on one hand, the user will feel tired due to the long-time holding, on the other hand, the output light source cannot be stable to achieve the purpose of lighting.

At present, there are pistol-type lights on the market, which are similar in shape, switch position and operation mode to pistols, they are easy to hold, and can be used for working condition check, night patrol, outdoor exploration or other scenes. In some application scenarios, it is expected that the light emitted by the pistol type light can be spread to expand the illumination range, and in other application scenarios, the light emitted by the pistol type light is expected to be more concentrated to increase the illumination. For this reason, some focus adjustable pistol type lights are coming into being. However, there are some problems of current adjustable pistol type lights, such as the displacement of the moving parts is relatively short, which makes the range of the focus adjusting performance be limited. Therefore, a new type of focus adjustable pistol type spotlight is needed.

Therefore, how to design a lighting tool that can be easily held by the user, and has the ability to hang in a place or fixed in a place is urgently needed to be solved.

SUMMARY OF THE PRESENT INVENTION

The invention is advantageous in that it provides a longitudinally gripping light device which comprises a gripping handle extended longitudinally from a light housing, the user's hand can longitudinally hold the gripping handle, then by rotating the user's gripping hand, the lighting direction of the longitudinally gripping light device can be adjusted with a relatively large range.

Another advantage of the present invention is to provide a longitudinally gripping light device, wherein the gripping handle is detachably connected to the light housing, in order for the user to conveniently use the longitudinally gripping light device in different ways, such as when the gripping handle is removed, the light housing can be held by the traditional way of the flashlight for providing lighting, or after the gripping handle is installed on the light housing, the longitudinally gripping light device can be used in a manner of holding the gripping handle.

Another advantage of the present invention is to provide a longitudinally gripping light device, wherein by rotating the gripping handle, the lighting direction of the longitudinally gripping light device can be adjusted in 360 degrees so that the adjusting range of the lighting direction is relatively large.

Another advantage of the present invention is to provide a longitudinally gripping light device, wherein after the longitudinally gripping light device is adjusted to a desired angle, the user is only required to hold it freely by the gripping hand and is not needed to move the hand and keep the hand in the hand holding posture with an unnatural offset gesture, such as the posture by rotating around the wrist to provide additional fixing force to maintain the lighting direction of the light device.

Another advantage of the present invention is to provide a longitudinally gripping light device, wherein the gripping handle is a retractable structure which can be acted as a supporting frame after being retracted, such that an end part of the longitudinally gripping light device and the gripping handle after retracted can be supported on the environmental surface, so as to allow the light device to provide the lighting effect with the fixed direction and release the user's hand.

Another advantage of the present invention is to provide a longitudinally gripping light device, wherein the light housing is installed with a plurality of light elements, the light housing is rotatable with respect to the gripping handle, so as to adjust one of the light elements to the desired position, such as to adjust a specific light element to the position which can emit the light forwardly.

The invention is advantageous in that it provides a focus adjustable pistol type spotlight, wherein the moving stroke of a movable part of the focus adjustable pistol type spotlight is relatively long, so that the range of the adjustable focus length is relatively large.

The invention is advantageous in that it provides a swivel hook pistol light, wherein the swivel hook pistol light is integrated with advantageous of providing lighting, convenient hanging, and convenient holding.

Another advantage of the present invention is to provide a swivel hook pistol light, wherein during directional light output, the swivel hook pistol light is adapted to be hanged at somewhere to achieve the purpose of the directional output for a long term, and also have the convenience and fixability compared to the conventional light source through a handle assembly to be held by an operator.

Another advantage of the present invention is to provide a swivel hook pistol light, wherein the swivel hook pistol light is adapted to achieve the purpose of hanging and hooking the whole light device in the air through a hook assembly.

Another advantage of the present invention is to provide a swivel hook pistol light, wherein the swivel hook pistol type is suitable to achieve the hanging purpose through different kinds of hanging ways of the hook assembly, so as to fit with different hanging items and having a relative strong environmental adaptability.

Another advantage of the present invention is to provide a swivel hook pistol light, wherein the swivel hook pistol light is adapted to achieve the purpose of directional light output for a long term from a high place by the hook assembly.

Another advantage of the present invention is to provide a swivel hook pistol light, wherein the hook assembly of the swivel hook pistol light is rotatably connected to the main body to achieve the purpose of adjusting the light output with different angles while fixing.

Another advantage of the present invention is to provide a swivel hook pistol light, wherein the swivel hook pistol light can be supported in a plane through the hook assembly to achieve the purpose of directional light output for a long term from a lower place.

Another advantage of the present invention is to provide a swivel hook pistol light, wherein the hook assembly of the swivel hook pistol light is convenient to be stored at the top part of the main body which avoids the damage produced by the collision, and is also adapted to allow a certain adjustability.

Another advantage of the present invention is to provide a swivel hook pistol light, wherein the swivel hook pistol light can achieve the mobile power charging, and can also have the DC power charging mode, which has a relatively strong usability.

According to the present invention, the foregoing and other objects and advantages are attained by a longitudinally gripping light device, comprising a light element and a gripping handle, wherein the gripping handle is detachably connected to the light element and extended in a longitudinal direction for a user to hold.

According to some embodiments, the light element comprises a lamp source and a light housing, wherein the lamp source is assembled in the light housing, and the light housing is detachably connected with the gripping handle in a slidable manner.

According to some embodiments, the light element further comprises one or more auxiliary lamp sources, wherein the lamp source and the auxiliary lamp sources provide lighting in different directions or the same direction.

According to some embodiments, wherein the light housing of the light device comprises one or more mounting members, the gripping handle comprises a mounting part, wherein each the mounting member comprises a guiding part, the mounting part has one or more fixing slots, and the guiding parts of the mounting members are respectively slid in the fixing slots, so that the gripping handle is capable of being mounted on the light housing of the light device.

According to some embodiments, the light element further comprises a control switch, wherein the control switch is arranged on the gripping handle.

According to some embodiments, the gripping handle comprises a plurality of sleeve parts to form a stretchable structure.

According to some embodiments, the gripping handle is arranged with a power module therein for supplying power for the light element.

According to some embodiments, wherein the control switch comprises a driving part and an electric connection part, the driving part is used for being pressed by the user to slide, causing that the electric connection part is communicated with the light element, and the electric connection part is arranged on a top side of the driving part; the control switch further comprises a positioning base, a positioning element, and a resetting element, the positioning base has one or more positioning slots, the driving part has a keeping slot, the driving part and the positioning slot are engaged in a slidable manner, the positioning element is slid in the keeping slot, the positioning base, the positioning element and the resetting element are fixed on the gripping handle, and the driving part is arranged on the gripping handle in a slidable manner.

According to some embodiments, the light element comprises at least a cooling fin connected between the lamp source and the light housing to disperse the heat of the lamp source.

According to some embodiments, the longitudinally gripping light device further comprises a supporting device which comprises two supporting elements respectively connected to the light element in a pivoted manner.

According to some embodiments, each of the supporting elements comprises a pivot joint part and a supporting body connected to the pivot joint part, the light element comprises two joining parts which are respectively pivotally connected to the pivot joint part of the supporting element, wherein each the joining part has a fixing hole and two fixing grooves on both sides respectively, wherein the pivot joint part comprises a fixing member and a plurality of fixing teeth arranged along a circumference, when the pivot joint part is pivotally connected with the corresponding joining part, said fixing teeth located on opposite sides are respectively positioned in the two fixing grooves.

The present invention further provides a longitudinally gripping light device, comprising:

a light element comprising a light housing, a lamp source and one or more auxiliary lamp source, wherein the lamp source and the one or more auxiliary lamp sources are assembled on different or the same side of the light housing; and a gripping handle, wherein the gripping handle is extended in a longitudinal direction for a user to hold, and the light element is movably mounted on the gripping handle, so as to be adjusted with respect to the position of the gripping handle, so as to switch one of the lamp source and the one or more auxiliary lamp sources to a desired lighting direction.

According to some embodiments, the light housing of the light element comprises a housing body and a mounting element, the mounting element comprises a connecting rod and a sphere, the sphere is connected to the end of the connecting rod, the gripping handle comprises a fixing base having a fixing cavity, the sphere is located in the fixing cavity of the fixing base, and the sphere is rotatable in the fixing cavity, so that the light housing is rotatable with respect to the gripping handle.

According to some embodiments, the light housing comprises a housing body and an assembly element, the assembly element is arranged on a bottom side of the housing body and comprises an assembly base, the assembly base is connected to the housing body and has an assembly hole in a center, a top side of the gripping handle is provided with an assembly part which is rotatably connected to the assembly base.

According to some embodiments, the assembly part comprises an assembly rod and a rotating gear, the rotating gear is connected to an end of the assembly rod and comprises a plurality of positioning teeth arranged with respect to each other in a spaced manner, wherein opposite sides of the assembly hole of the assembly base are respectively provided with two limit slots, each the limit slot is arranged with a compression part and a reset spring, and the rotating gear is arranged in the assembly hole of the assembly element, and each compression part is pressed against the rotating gear under the elastic force of the reset spring, thereby fixing the relative position of the rotating gear and the assembly base.

According to some embodiments, the longitudinally gripping light device further comprising a supporting device comprises two supporting elements each pivotally connected to the light element.

According to some embodiments, each of the supporting elements comprises a pivot joint part and a supporting body connected to the pivot joint part, the light element comprises two joining parts which are respectively pivotally connected to the pivot joint part of the supporting element, each the jointing part has a fixing hole, and two fixing grooves on both sides respectively, the pivot joint part comprises a fixing member and a plurality of fixing teeth arranged along a circumference, when the pivot joint part is pivotally connected with the corresponding joining part, the fixing teeth located on opposite sides are respectively positioned in two the fixing grooves.

The present invention further provides a focus adjustable pistol type spotlight, comprising:

a mounting main housing having a pistol configuration and at least one receiving cavity located therein;

a light source assembly comprising at least one lighting body; and a lens assembly located on an exit path of the light source assembly, wherein the lens assembly comprises at least one lens; wherein at least one of the at least one lighting body is mounted on the mounting main housing along an optical axis of the light source assembly in a movable manner such that the at least one lighting body is able to move with respect to the lens assembly.

According to some embodiments, the light source assembly comprises a driving inner barrel, and a driving outer barrel covered at an outer side of the driving inner barrel, the lighting body is installed on the driving inner barrel, and the driving inner barrel is mounted on the driving outer barrel along the optical axis of the light source assembly in a movable manner.

According to some embodiments, at least part of the driving outer barrel and at least part of the driving inner barrel are contained in the receiving cavity of the mounting main housing.

According to some embodiments, the driving inner barrel has external threads located on a surface thereof, and the driving outer barrel has internal threads located on an inner wall thereof to enable the driving inner barrel to move within the driving outer barrel, so as to drive the lighting body to move with respect to the lens assembly.

According to some embodiments, the driving outer barrel is mounted on the mounting main housing in a rotatable manner along the optical axis of the light source assembly, and the driving outer barrel is immovable in the direction of the optical axis of the light source assembly so that during the process of being rotated of the driving outer barrel, the driving inner barrel is moved along the optical axis of the light source assembly in the driving outer barrel and drives the lighting subject body to move with respect to the lens assembly.

According to some embodiments, the light source assembly further comprises a guiding member mounted on the driving inner barrel for guiding the driving inner barrel to move along the optical axis of the light source assembly.

According to some embodiments, the light source assembly further comprises a guiding inner barrel covered at an outer side of the driving inner barrel, the driving inner barrel comprises an inner barrel body and at least one fixing protrusion formed on the outer surface of the inner barrel body; the guiding inner barrel has at least one guiding groove corresponding to the fixing protrusion, and the extension direction of at least part of the guiding groove is consistent with the optical axis of the light source assembly, and the fixing protrusion is arranged in the guiding groove in a slidable manner.

According to some embodiments, the driving inner barrel comprises a plurality of fixing protrusions arranged with respect to each other in a spaced manner, and the plurality of the guiding inner barrels have the plurality of the guiding grooves corresponding to the plurality of fixing protrusions.

According to some embodiments, the external threads of the driving inner barrel are formed on an outer surface of the fixing protrusion.

According to some embodiments, the light source assembly further comprises an operating sleeve, a light source mounting body and an optical bowl, the operating sleeve is covered at an outer side of the driving outer barrel, the light source mounting body is installed in the driving inner barrel, the lighting subject body is installed in the light source mounting body and extended out of the driving inner barrel; the optical bowl is covered at the outer side of a periphery of the lighting body.

The present invention further provides a swivel hook pistol light comprising:

a main body for providing the light output at a front side;

a handle assembly connected to the main body for a user to hold; and a hook assembly, wherein the hook assembly is foldably installed on the main body, wherein the handle assembly and the main body are respectively arranged on both sides of the main body, wherein the hook assembly has a using state and a folding state, wherein when the hook assembly is in the using state, the hook assembly is away from the main body, and the hook assembly is suitable for being suspended, wherein when the hook assembly is reverted and supported on a supporting surface, the hook assembly and a back end part of the main body form a supporting structure for supporting the swivel hook pistol light, wherein when the hook assembly is in the folding state, the hook assembly is attached to one side of the main body.

According to some embodiments, the hook assembly comprises a folding member, a rotating member and a hanging member, the folding member is foldably connected to the main body, the rotating member is rotatably connected to the folding member, the hanging member is connected to the rotating member, the hanging member further comprises a clipping end, the clipping end is detachably connected to another side of the rotating member.

According to some embodiments, the hanging member comprises a fixing end and has at least one hanging slot, the fixing end is foldable mounted with one side of the rotating member, the clipping end is detachably clipped with the other side of the rotating member, the hanging slot is located between the fixing end and the clipping end, when the swivel hook pistol light is in a hanging state, the swivel hook pistol light is suitable for hanging and fixing through the hanging slot.

According to some embodiments, the rotating member has a fixing groove and a clipping groove, the fixing groove and the clipping groove are arranged on both sides of the rotating member, the fixing groove is suitable for foldably fixing the fixing end, the clipping groove is suitable for being detachably fixing the clipping end.

According to some embodiments, the rotating member further comprises a clipping end, wherein the clipping end is arranged on one side of the clipping groove, wherein a gap is provided between the clipping end and a bottom of the rotating member for allowing the clipping end to be fitted into the gap to fix the clipping end.

According to some embodiments, the rotating member further comprises a rotation unit which is installed on a top of the folding member.

According to some embodiments, the main body comprises a housing, a lamp source and a power supply, the housing provides a mounting space, the lamp source and the power supply are installed inside the housing, the lamp source is suitable for providing a light source output, the power supply is suitable for providing energy supply, the lamp source is arranged in the front part of the power supply, the lamp source is electrically connected to the power supply.

According to some embodiments, the main body comprises a connecting element, and the hook assembly is installed on the main body through the connecting element in a manner which is adapted to be foldable, wherein the connecting element is arranged on a front of the main body and is arranged on the same side with the hook assembly.

According to some embodiments, the handle assembly comprises a holding body and a pressing unit, the holding body is connected to the housing, the pressing unit is electrically connected to the lamp source, and the pressing unit is movably installed on the holding body to control the light source output of the lamp source.

The present invention further provides a swivel hook pistol light, comprising:

a main body for providing the light output at a front side;

a handle assembly connected to the main body for a user to hold; and a hook assembly, wherein the hook assembly comprises a pair of folding members, a pair of rotating members and a pair of hanging members, wherein each the rotating member is rotatably connected to the main body, each the folding member is foldably connected to the corresponding rotating member, each the hanging member is connected to the corresponding folding member for providing hanging and inverted support.

According to some embodiments, when the swivel hook pistol light is in a supporting state, the hanging member is located at the lower part of the main body, and the hanging member is directly in contact with a placing plane.

According to some embodiments, when the swivel hook pistol light is in a holding state, one side of the hanging member is covered on the other side of the upper part of the hanging member in a manner which is adapted to be folded, the hanging member is close to and attached to a top part of the main body.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
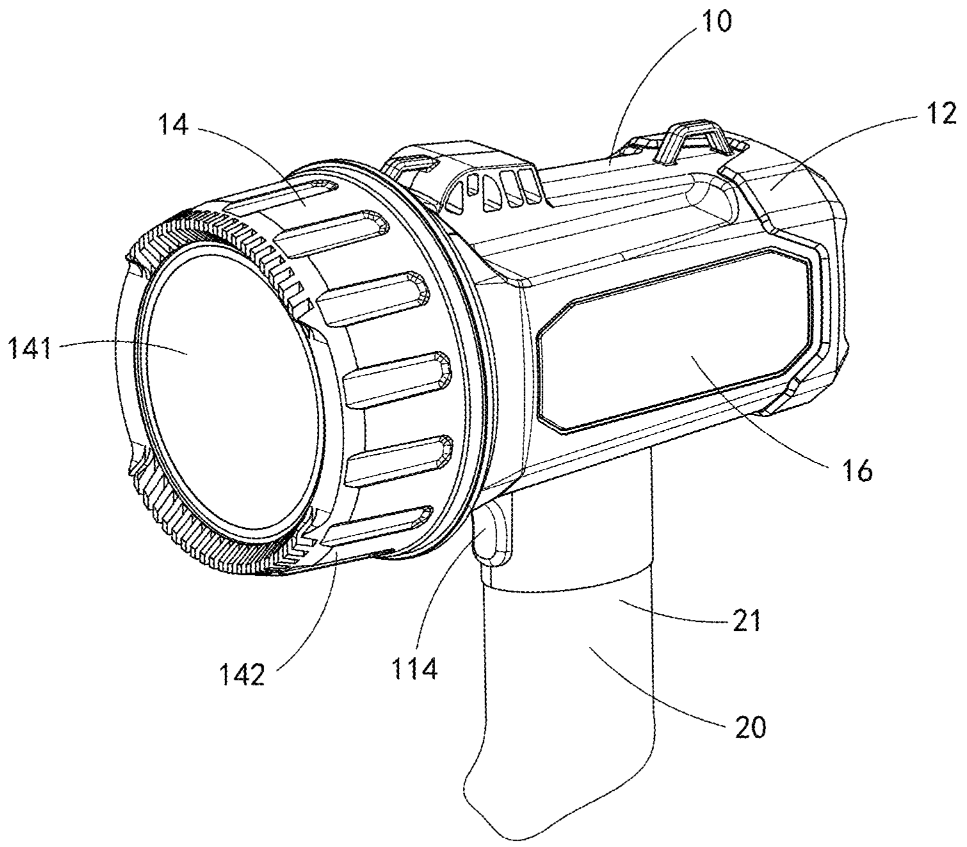
FIG. 1 is a perspective view of a longitudinally gripping light device according to a first preferred embodiment of the prevent invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "lower," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

It should be understood that the term "a" or "an" should be understood as "at least one" or "one or more". In other words, in one embodiment, the number of an element may be one, and in another embodiment, the number of the element may be plural. The term "a" or "an" should not be understood as a limitation on the number.

Referring to FIGS. 1 to 5 of the drawings, a longitudinally gripping light device according to a first embodiment of the present invention is illustrated, wherein the longitudinally gripping light device comprises a light element 10 and a gripping handle 20, wherein the gripping handle 20 is connected to the light element 10 and extended in a longitudinal direction for a user to hold the gripping handle 20 in a longitudinally gripping manner, so as to conveniently adjust the lighting direction of the light element 10.

It can be understood that the longitudinally gripping light device of the present invention is such a device that when the user holds the gripping handle 20, the gripping handle 20 is not arranged in a horizontal direction, but is extended along the vertical direction or at a predetermined angle with the vertical direction, so that when the gripping handle 20 is rotated, the lighting direction of the light element 10 can also be conveniently adjusted. For example, when the gripping handle 20 is rotated in the user's gripping hand, the gripping handle 20 can be rotated 360 degrees, so that the light element 10 can be rotated 360 degrees to adjust its lighting direction to the desired position. When the user's gripping hand is left hand or right hand, the user can rotate the gripping hand around a wrist to adjust the position of the gripping handle 20, so as to adjust the lighting direction of the light element 10.

The light element 10 comprises one or more lamp sources 11, a light housing 12, a reflector 13 and an output lens 14, wherein the lamp sources 11, the reflector 13 and the output lens 14 are mounted on the light housing 12, thereby assembling into the light element 10. The gripping handle 20 is longitudinally connected to the light housing 12 of the light element 10 for the gripping of the user.

Figure 3:
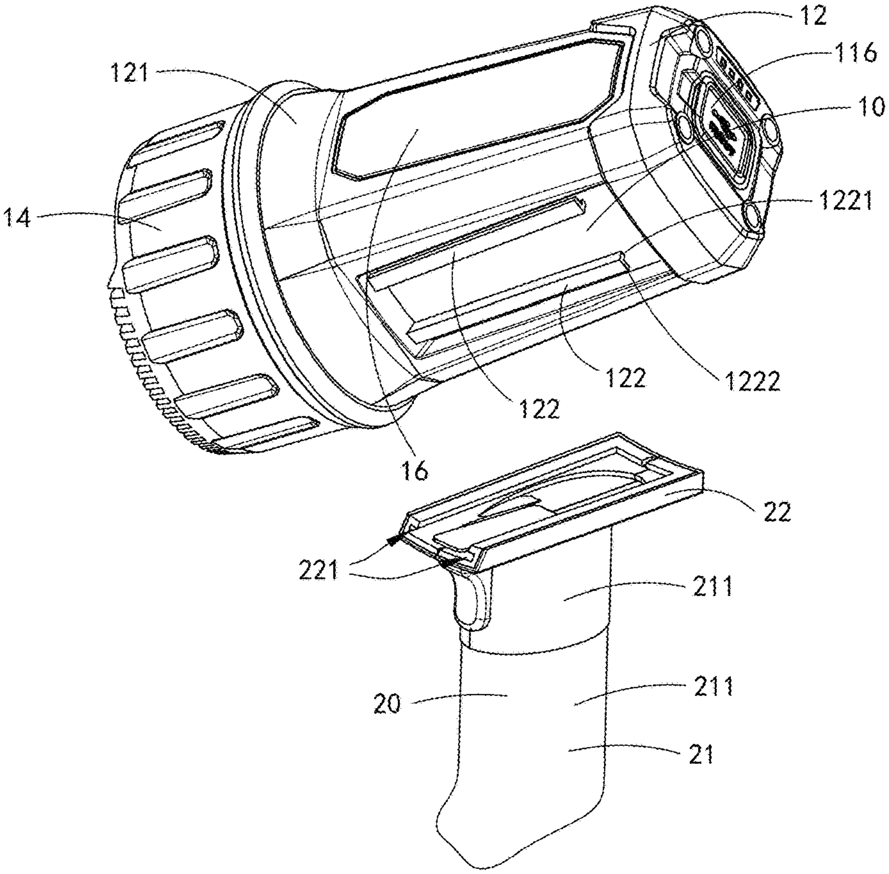
FIG. 3 is an exploded view illustrating the connection manner between its gripping handle and a light housing of the longitudinally gripping light device according to the above first preferred embodiment of the prevent invention.

Referring to the FIG. 1 and FIG. 3 of the drawings, the gripping handle 20 forms a predetermined angle with the light housing 12 of the light element 10, and when the light housing 12 of the light element 10 is extended horizontally, the gripping handle 20 is extended substantially in a vertical direction, and the gripping handle 20 is arranged on the bottom side of the light housing 12 of the light element 10. The gripping handle 20 can be integrally connected to the light housing 12, and in this embodiment, the gripping handle 20 is connected to the light housing 12 in a detachable manner, thus facilitating the removal of the gripping handle 20 from the light housing 12.

It is understood that when the gripping handle 20 is taken down from the light housing 12, the light element 10 can be a flashlight device, and the user can hold the light housing 12 to adjust the lighting direction of the lamp source 11 of the light element 10. When the gripping handle 20 is installed on the light housing 12, the gripping handle 20 extends longitudinally from the light housing 12, so that the user can hold the gripping handle 20 to facilitate the user to hold the gripping handle 20 to adjust the lighting direction of the lamp source 11 of the light element 10. That is to say, the light element 10 can be conveniently switched between two use modes by means of a detachable connection between the gripping handle 20 and the light element 10.

Figure 2:
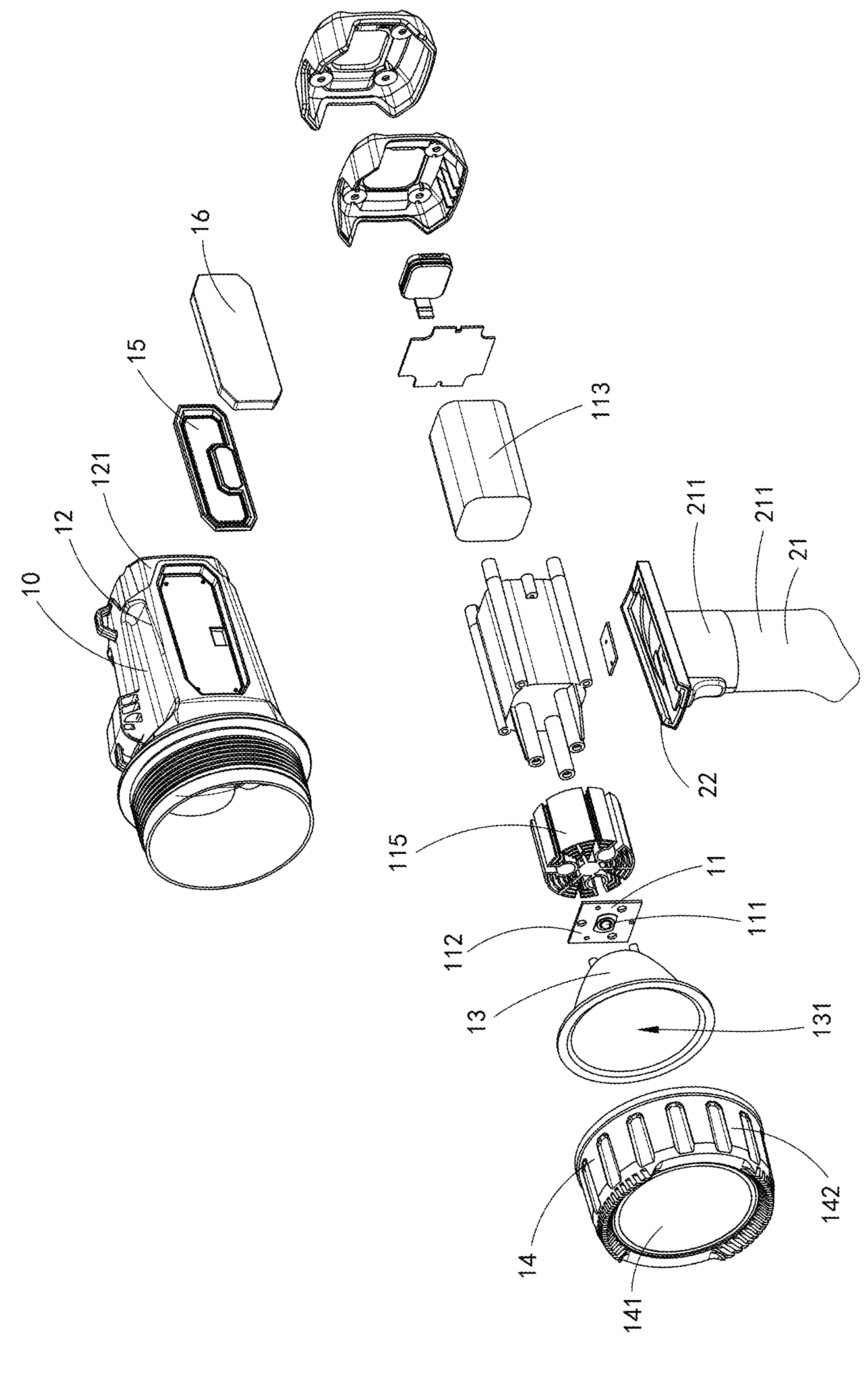
FIG. 2 is an exploded view of the longitudinally gripping light device according to the above first preferred embodiment of the prevent invention.

Referring to the FIGS. 1 to 3 of the drawings, the gripping handle 20 comprises a gripping body 21 and one or more mounting parts 22, the gripping body 21 is used for the hand of the user to hold, and the mounting parts 22 are connected to the gripping body 21 for detachably assembling with the light housing 12 of the light element 10. More specifically, the light housing 12 comprises a housing body 121 and one or more mounting members 122, wherein the mounting parts 22 and the mounting members 122 are detachably assembled so that the gripping handle 20 and the light element 10 are detachably assembled.

More specifically, for example, the light housing 12 comprises two mounting members 122 arranged with respect to each other in a spaced manner, wherein each mounting member 122 comprises an extending part 1221 and a guiding part 1222, the guiding part 1222 is laterally extended from the extending part 1221, and the extending part 1221 is extended to the bottom side of the housing body 121. In this embodiment, the guiding part 1222 is constructed with the shape of long strip. Each mounting part 22 has two fixing slots 221, and two guiding part 1222 of the mounting members 122 slide respectively in the two fixing slots 221, so that the guiding parts 1222 are positioned in the corresponding fixing slots 221, so that the gripping handle 20 can be mounted on the light housing 12 of the light element 10. When the gripping handle 20 needs to be removed from the light housing 12, the guiding part 1222 can be driven and moved away from the fixing slot 221, so that the gripping handle 20 can be detached from the light housing 12.

The lamp source 11 comprises one or more lighting members 111, a control circuit board 112, a power module 113, a control switch 114 and a heat dissipating element 115, wherein the lighting member 111 can be a variety of light sources that can emit light, such as LED, OLED, fluorescent lights, etc. Each lighting member 111 is electrically connected to the control circuit board 112 and the power module 113. When the control switch 114 is operated, the lighting member 111 is illuminated under the control of the control circuit 113 and the provision of the power supply of the power module 113. The heat dissipating element 115 is connected to the control circuit board 112 to dissipate the heat generated by the lighting member 111 in time.

The lighting member 111 is arranged inside the reflector 13, and the internal surface of the reflector 13 is formed with a reflective cavity 131, wherein the light emitted by the lighting member 111 is emitted into the reflective cavity 131 and reflected by the internal surface of the reflector 13, so that after reflected, the light then is projected to the output lens 14. That is to say, the reflector 13 plays a convergent role after reflecting the light emitted by the light element 111, the output lens 14 plays the role of transmitting light, the output lens 14 can also play the role of converging light, for example, the output lens 14 is a convex lens, the light element 111 is arranged at the focus position of the output lens 14. The output lens 14 comprises a lens part 141 and a mounting portion 142. The inner surface of the mounting portion 142 of the output lens 14 is adapted to be threaded, and the position where the light housing 12 is engaged with the output lens 14 is also provided with threads, so that the output lens 14 and the light housing 12 can be assembled together through the matched threads.

The control switch 114 can be arranged on the light housing 12 or on the gripping handle 20. In this embodiment, the control switch 114 is arranged on the gripping handle 20 and electrically connected to the control circuit board 112, such as arranged in the gripping handle 20 through a wire and electrically connected to the control circuit board 112 in the light housing 12 within the light housing 12.

Referring to the FIG. 1 and FIG. 3 of the drawings, the control switch 114 is protruded from the gripping handle 20, which can be constructed as a key to initiate the lighting operation of the lighting member 111 when pressed. In another embodiment, the control switch 114 is also adapted to be implemented as a knob or slide switch, so as to control the light and close of the lighting member 111 when it is rotated and slid by the user' hand.

Figure 4:
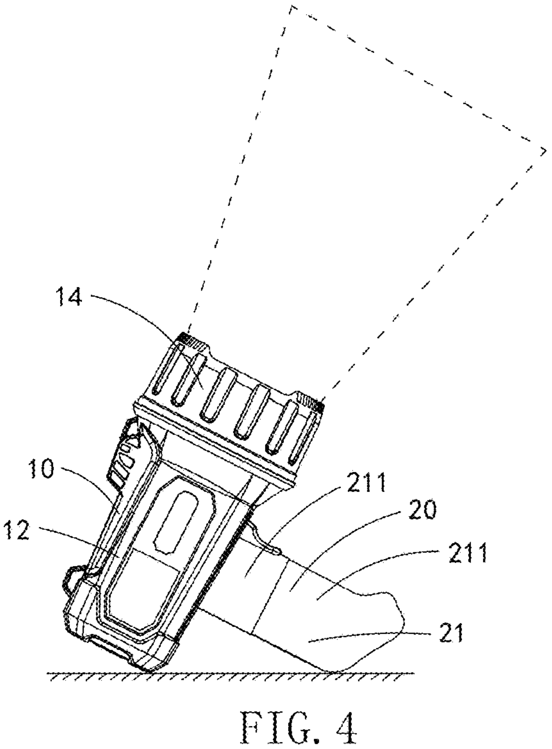
FIG. 4 is a schematic view illustrating an application scenario of the longitudinally gripping light device according to the above first preferred embodiment of the prevent invention.
Figure 5:
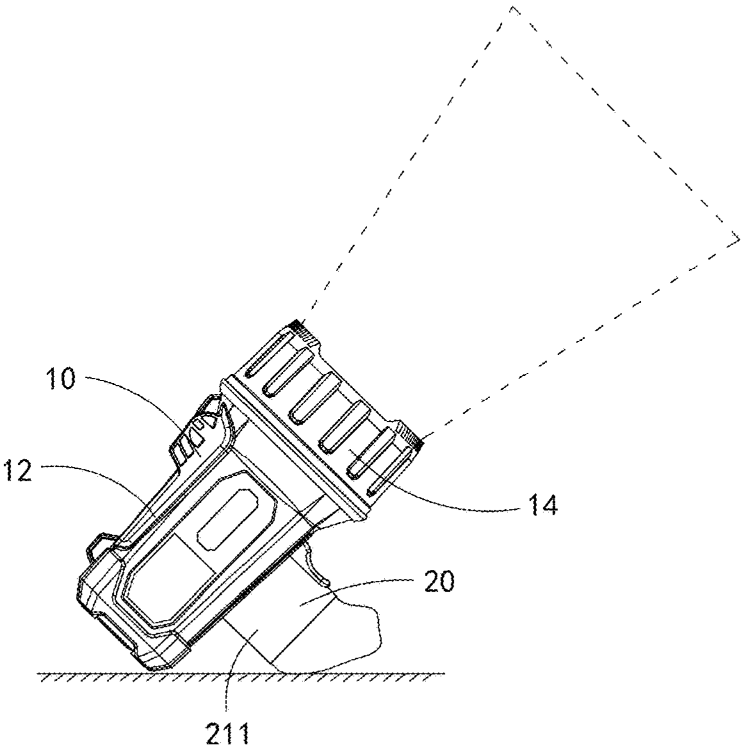
FIG. 5 is another schematic view illustrating an application scenario of adjusting the retractable gripping handle of the longitudinally gripping light device according to the first preferred embodiment of the present invention.

Referring to the FIG. 4 and FIG. 5 of the drawing, the gripping handle 20 is adapted to be constructed as a stretchable structure, and the gripping body 21 comprises a plurality of sleeve parts 211, such as two sleeve parts 211, for example, a sleeve part 211 on the bottom side is sleeved in another sleeve part 211 on the top side, and when the two are sleeved together, the length of the gripping handle 20 can be reduced, so that the end of the gripping handle 20 and the light element 10 can be supported on the environmental surface, so that the output lens 14 faces towards the direction required to be illuminated, so that the user's hand is no longer needed to be held the gripping handle 20 and is freed to do other things.

In this embodiment of the invention, the light elements 10 are also adapted to comprise one or more auxiliary lamp sources 15 and one or more auxiliary output lenses 16, wherein each auxiliary lamp source 15 is also adapted to be electrically connected to the control circuit board 112 and the power module 113, thereby being controlled by the control circuit board 112 and being provided with the power supply through the power module 113. The light type formed by the lamp source 11 and the auxiliary lamp source 15 can be different, for example, the cross section of the output lens 14 is circular, thus forming a circular spot, and the cross section of the auxiliary output lens 16 can be square, thus forming a square spot.

The auxiliary lamp source 15 is adapted not to provide the reflector 113, and the auxiliary output lenses 16 is adapted not to play a concentrating role but only allow the light to be emitted, so that the light emitted by the auxiliary lamp source 15 forms a scattered light spot instead of a converged light spot, and the light emitted by the lamp source 11 forms the converged light spot. Thus, the lamp source 11 and the auxiliary lamp source 15 can provide the different lighting spots, and when the user's hand holds the gripping handle 20 and rotates the gripping handle 20, the lamp source 11 or the auxiliary lamp source 15 can be selected to be adjusted to the required lighting position, so as to select one of the light sources as the lighting light source.

It is understood that the lamp source 11 and the auxiliary lamp source 15 are adapted to be arranged on the different sides of the light housing 12 or can be arranged on the same side.

Figure 6:
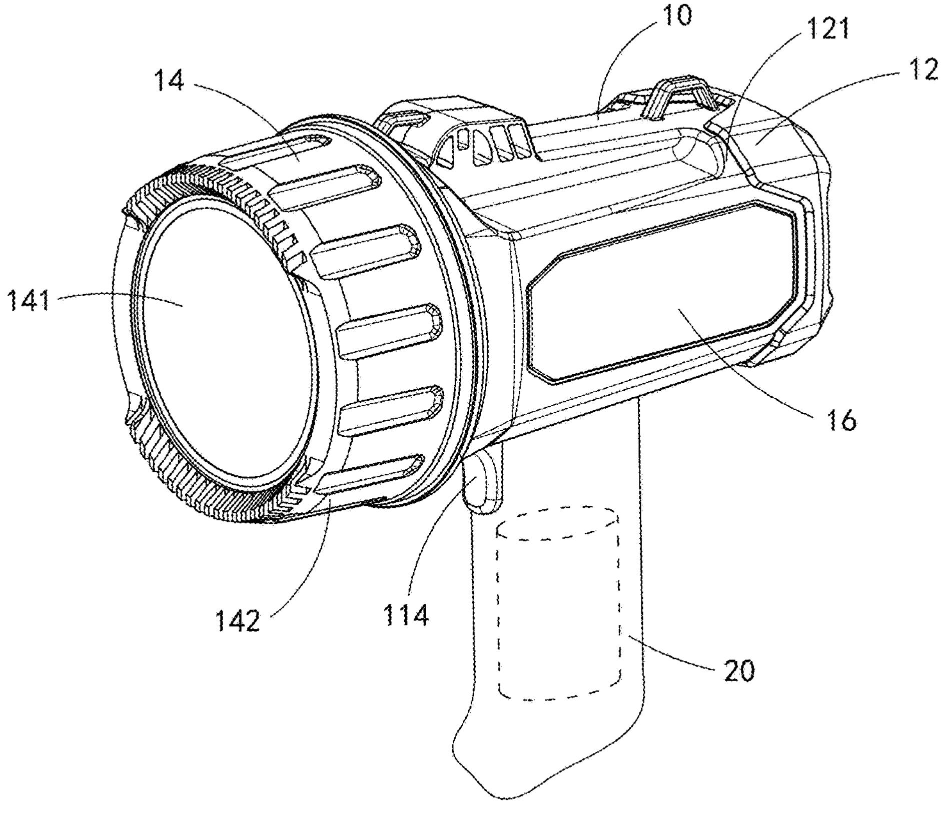
FIG. 6 is an exploded view illustrating that the gripping handle can be installed with a power module of the longitudinally gripping light device according to a first alternative mode of the first preferred embodiment of the present invention.
Figure 7:
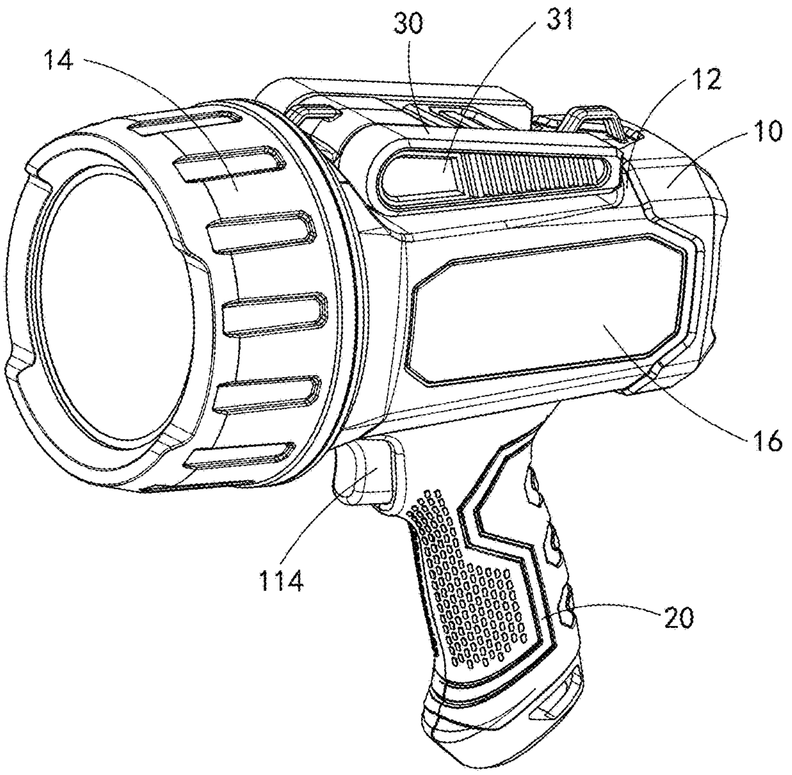
FIG. 7 is a perspective view of the longitudinally gripping light device according to a second preferred embodiment of the present invention.
Figure 8:
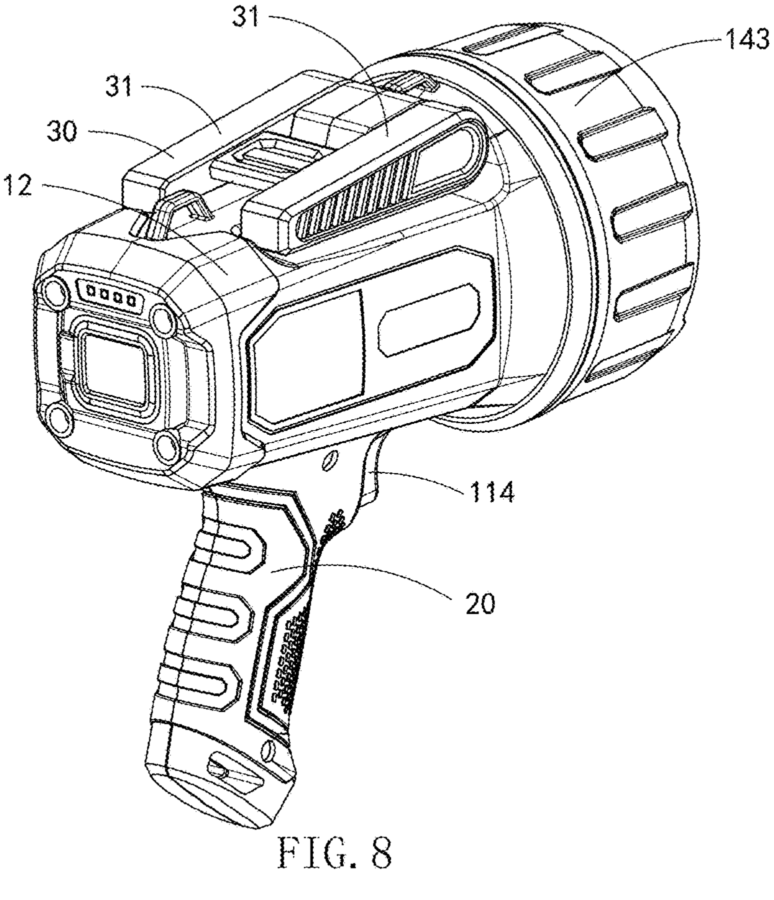
FIG. 8 is another perspective view of the longitudinally gripping light device according to the above second preferred embodiment of the present invention.
Figure 9:
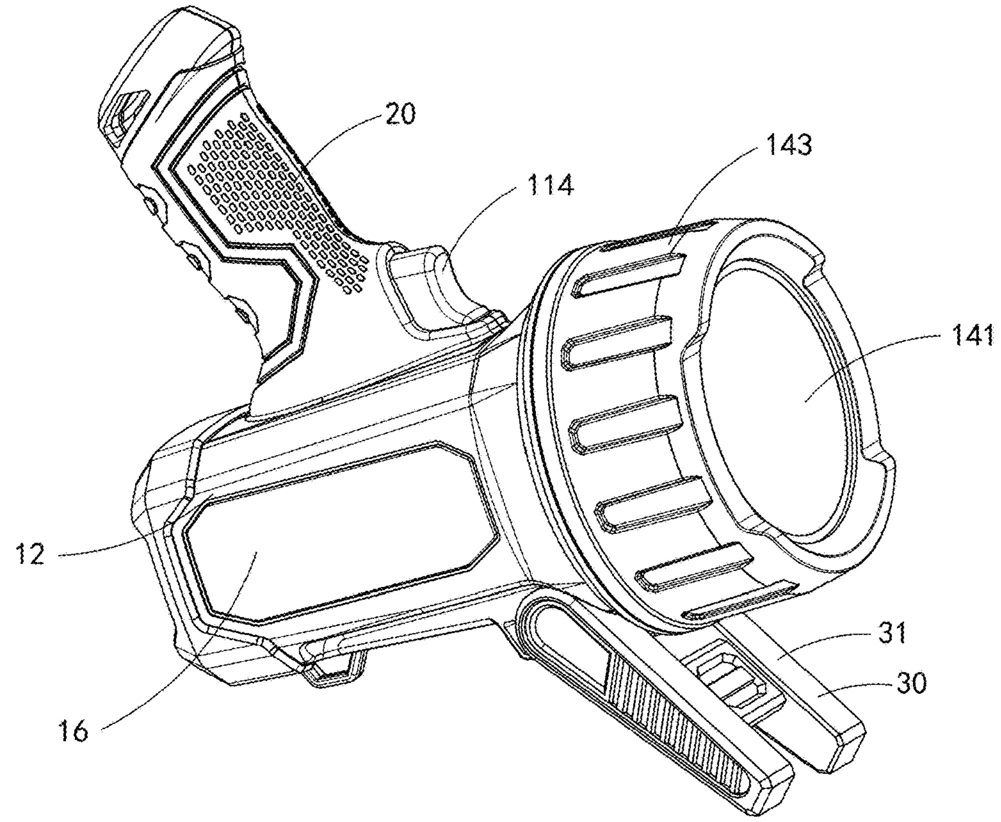
FIG. 9 is a perspective view illustrating its movable supporting device of the longitudinally gripping light device according to the above second preferred embodiment of the present invention.

Referring to the FIG. 6 of the drawing, according to another embodiment of the invention, the power module 113 can be arranged on the gripping handle 20, and when the gripping handle 20 is assembled with the light element 10, the power module 113 is electrically connected to the control circuit board 112, thereby supplying power to the control circuit board 112, the lamp source 11 and the auxiliary lamp source 15. It is understood that the control circuit board 112 is provided with two electric connection contacts accordingly, when the gripping handle 20 is assembled on the bottom side of the light element 10, the positive and negative poles of the power module 113 and the two electric connection contacts of the control circuit board 112 can be contacted in a conductive manner, so that the power module 113 is electrically connected with the control circuit board 112. The two electric connection contacts are adapted to be fixed on the light housing 12 and is adapted to be electrically connected to the main board of the control circuit board 112 by an electrical connection wire.

It is understood that in this embodiment of the invention, the gripping handle 20 is also provided with a corresponding charging interface 116, and the power module 113 is a rechargeable battery electrically connected to the charging interface 116, so that the power module 113 can be electrically connected to the charging device through the charging interface 116, thus charging for the power module 113. In this embodiment of the invention, the longitudinally gripping light device comprises a plurality of gripping handles 20 with the power module 113, such that when a gripping handle 20 is loaded on the light element 10 and powered by the power module 113 therein meanwhile the power supply of the power module 113 is exhausted, another gripping handle 20 with the power module 113 is adapted to be mounted on the light element 10. The power module 113 of the removed gripping handle 20 can be recharged through a charging device as a backup.

Referring to the FIGS. 7-15 of the drawings, a longitudinally gripping light device according to a second embodiment of the present invention is illustrated, wherein the longitudinally gripping light device comprises the light element 10, the gripping handle 20 and a supporting device 30, the gripping handle 20 arranged on the bottom side of the light element 10 is connected to the light element 10 and extended in a longitudinal direction for the user to hold the gripping handle 20 in a longitudinally gripping manner, so as to conveniently adjust the lighting direction of the light element 10. The supporting device 30 is arranged on the top side of the light element 10 and connected to the light element 10.

The light element 10 comprises one or more lamp sources 11, a light housing 12, a reflector 13 and an output lens 14, wherein the lamp source 11, the reflector 13 and the output lens 14 are mounted on the light housing 12, thereby assembling into the light element 10. The gripping handle 20 is longitudinally connected to the light housing 12 of the light element 10 for the user to hold.

The gripping handle 20 comprises a gripping body 21 and one or more mounting parts 22, wherein the gripping body 21 is similar to a pistol stock which is used for the hand of the user to hold, and each mounting part 22 is connected to the gripping body 21 for the removable assembling with the light housing 12 of the light element 10. More specifically, the light housing 12 comprises a housing body 121 and one or more mounting members 122, wherein the corresponding mounting part 22 and the mounting member 122 are detachably assembled so that the gripping handle 20 and the light element 10 are detachably assembled. The gripping body 21 is adapted to comprise an inner supporting handle 212 and an outer elastic sleeve 213, wherein each of the inner supporting handle 212 and the outer elastic sleeve 213 can comprise two parts, and the elastic sleeve 213 is arranged to be put on the outer side of the supporting grip 212 to increase the friction when the user holds it.

More specifically, for example, the light housing 12 comprises two mounting members 122 arranged with respect to each other in a spaced manner, and each mounting member 122 comprises an extending part 1221 and a guiding part 1222, wherein the guiding part 1222 is extended laterally to the corresponding extending part 1221, and the extending part 122 is extended from the bottom side of the housing body 121. In this embodiment, the guiding part 1222 is constructed to be a long strip shape. Each mounting part 22 has two fixing slots 221, and the guiding parts 1222 of the two mounting members 122 are respectively slid in the two fixing slots 221, so that the guiding parts 1222 are limited in the position of the corresponding fixing slots 221, so that the gripping handle 20 can be mounted on the light housing 12 of the light element 10. When the gripping handle 20 needs to be removed from the light housing 12, the guiding parts 1222 can be driven and moved away from the fixing slot 221 so that the gripping handle 20 can be detached from the light housing 12.

The lamp source 11 comprises one or more lighting members 111, a control circuit board 112, a power module 113, a control switch 114 and a heat dissipating element 115, the output lens 14 comprises a lens part 141 and a mounting portion 142, wherein the internal surface of the mounting portion 142 is adapted to have threads, and the position where the light housing 12 is engaged with the output lens 14 is also provided with threads, so that the output lens 14 and the light housing 12 can be assembled together by the matched threads. The output lens 14 is also adapted to comprise a buffer sleeve 143, which can be made by rubber or silicone material, and mounted on the outer side of the mounting portion 142 to provide an elastic buffer effect.

The control switch 114 can be arranged on the light housing 12 or on the gripping handle 20. In this embodiment, the control switch 114 is arranged in the gripping handle 20 and electrically connected to the control circuit board 112, such as through a wire arranged in the gripping handle 20 and electrically connected to the control circuit board 112 of the light housing 12 within the light housing 12.

In this embodiment of the invention, the light element 10 is also adapted to comprise an auxiliary lamp source 15 and an auxiliary output lens 16, wherein the auxiliary lamp source 15 is also adapted to be electrically connected to the control circuit board 112 and the power module 113, thereby being controlled by the control circuit board 112 and being provided with the power supply by the power module 113. The light type formed by the lamp source 11 and the auxiliary lamp source 15 can be different, for example, the cross section of the output lens 14 is circular, thus forming a circular spot, and the cross section of the auxiliary output lenses 16 can be square, thus forming a square spot.

The control switch 114 comprises a driving part 1141 and an electric connection part 1142. The driving part 1141 is adapted to be pressed by the user to slide, so that the electric connection part 1142 is connected with the control circuit board 112. Thus, the power module 113 supplies power to the control circuit board 112 to start the lamp source 11 and the auxiliary lamp source 15 to emit light.

Figure 10:
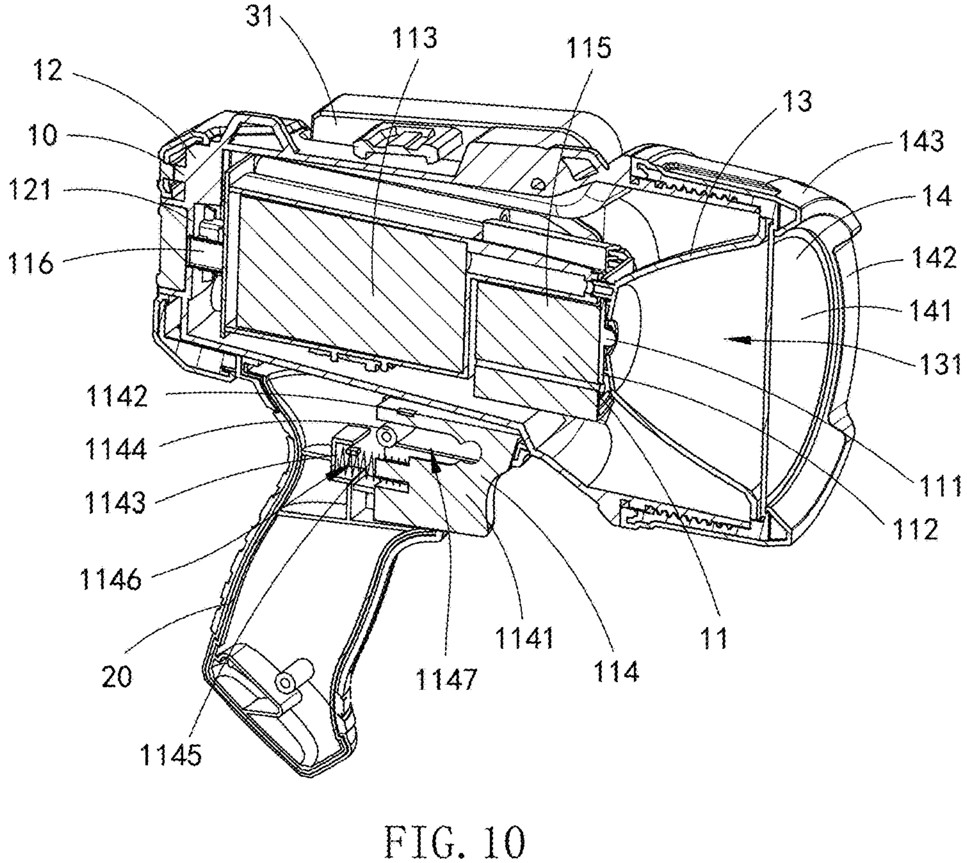
FIG. 10 is a cutaway schematic view illustrating a control switch installed at the gripping handle of the longitudinally gripping light device according to the above second preferred embodiment of the present invention.
Figure 11:
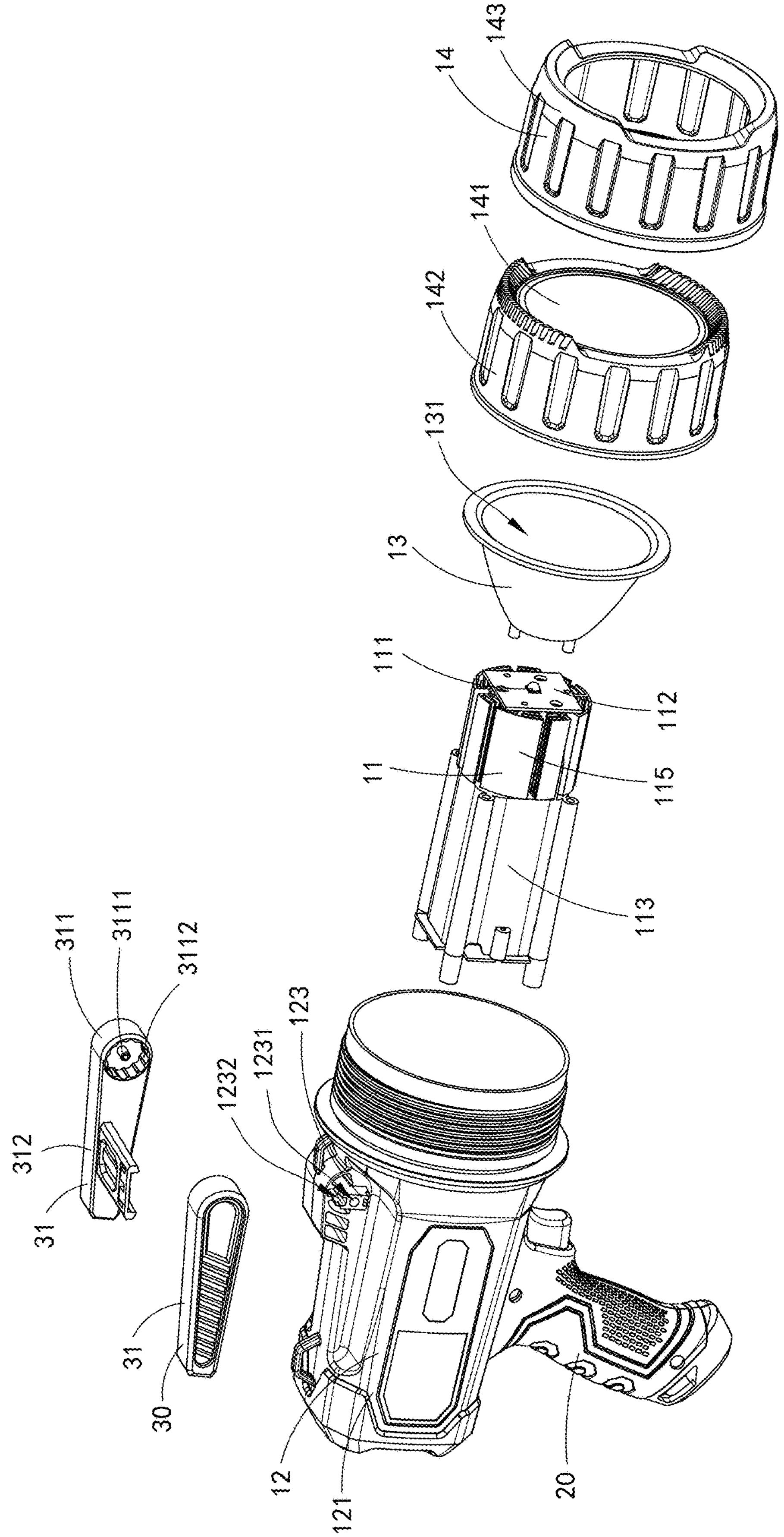
FIG. 11 is an exploded view of the longitudinally gripping light device according to the above second preferred embodiment of the present invention.
Figure 12:
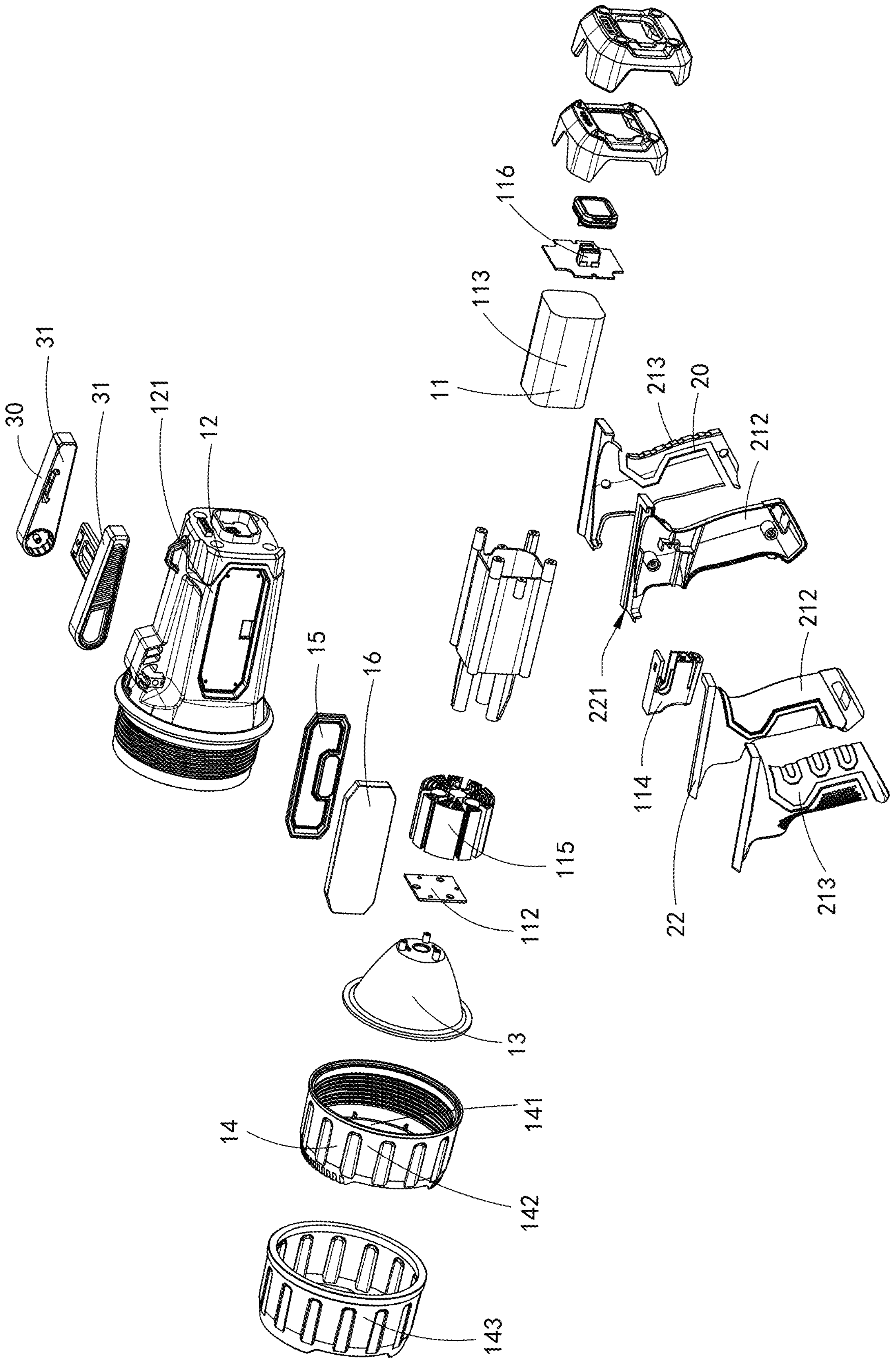
FIG. 12 is another exploded view of the longitudinally gripping light device according to the above second preferred embodiment of the present invention.
Figure 13:
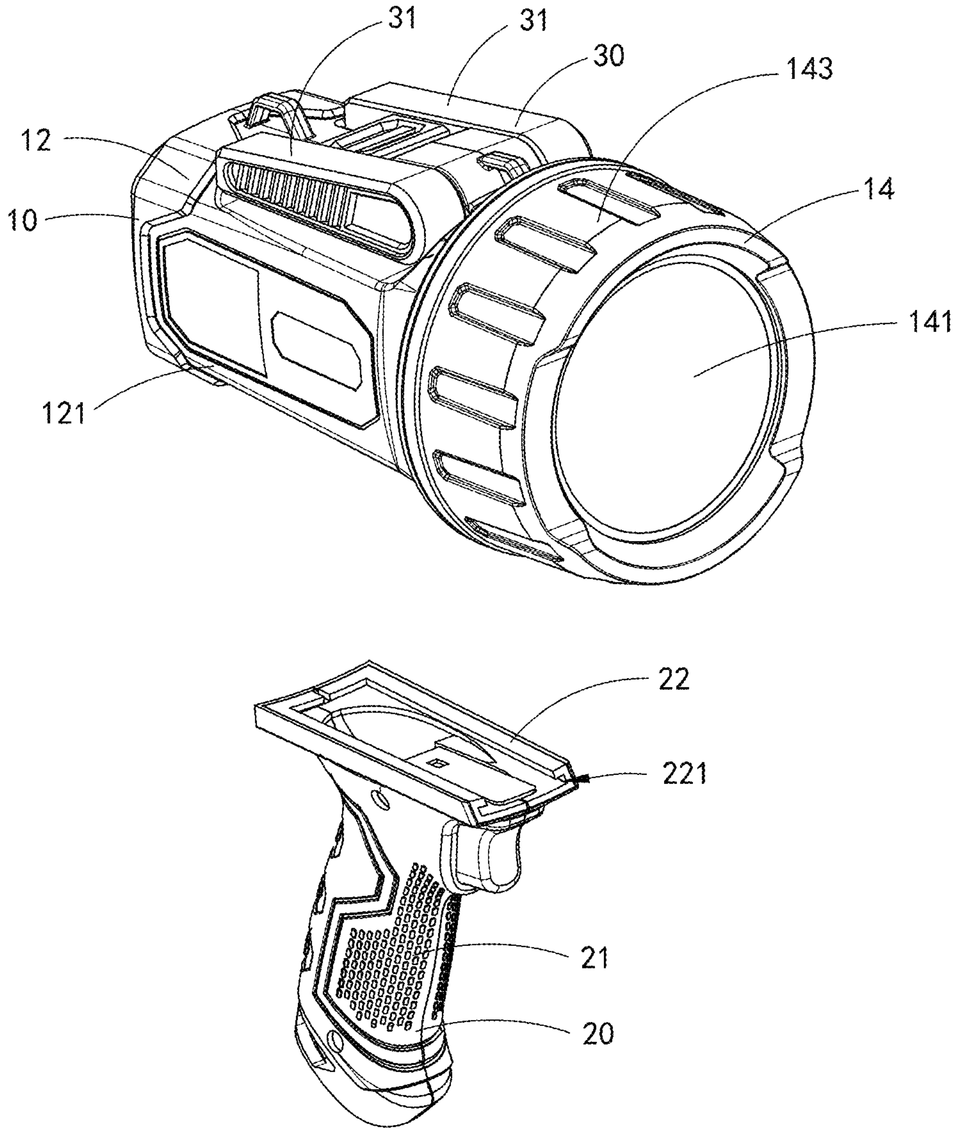
FIG. 13 is a perspective view illustrating the longitudinally gripping light device according to the above second preferred embodiment of the present invention, wherein a light element and a gripping handle have been detached.
Figure 14:
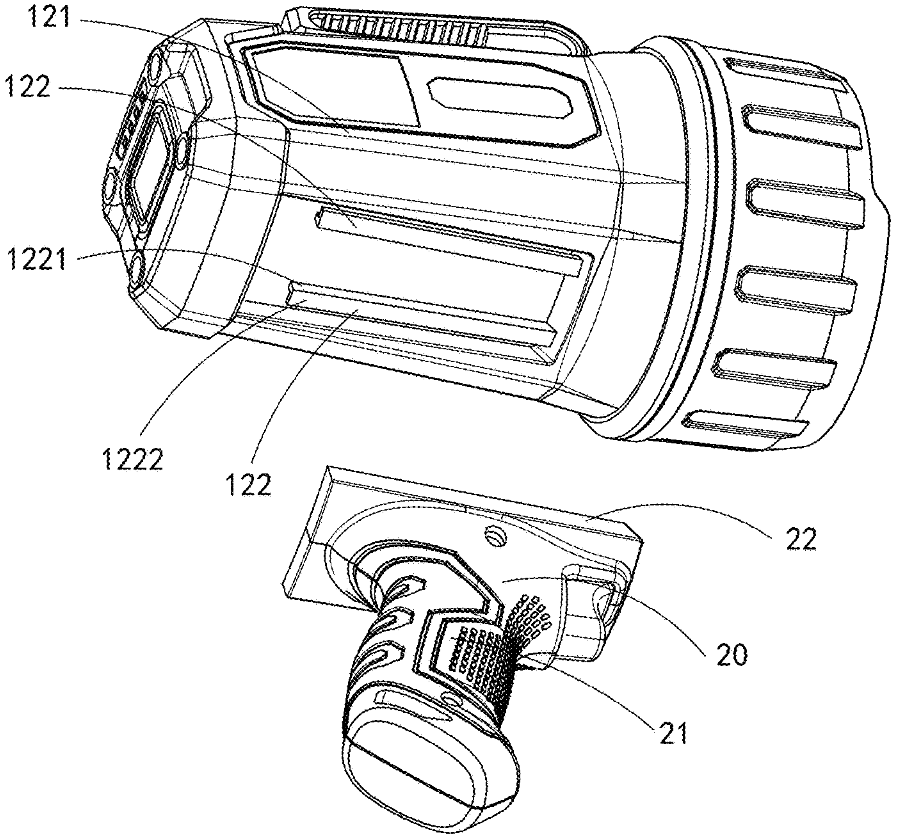
FIG. 14 is another perspective view illustrating the longitudinally gripping light device according to the above second preferred embodiment of the present invention, wherein the light element and the gripping handle have been detached.
Figure 15:
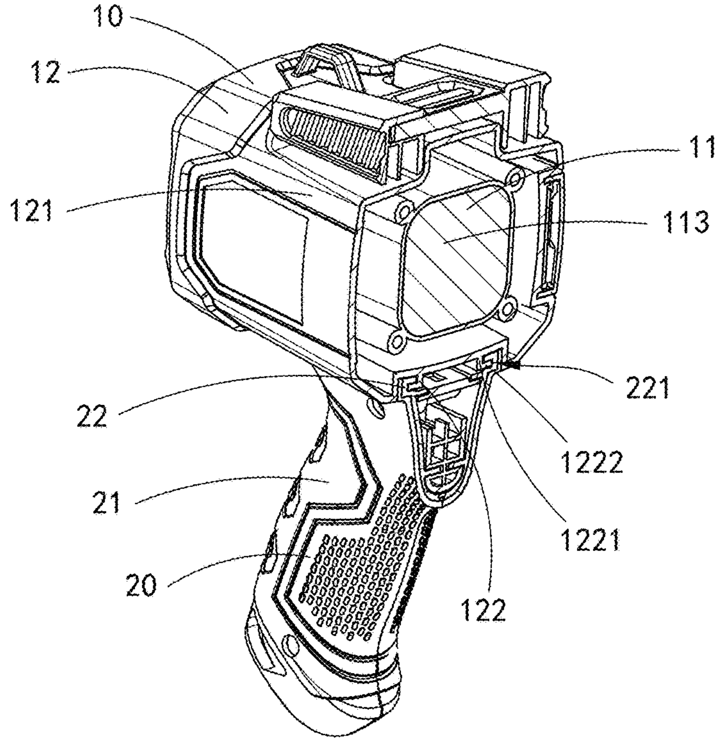
FIG. 15 is a structural schematic view illustrating the longitudinally gripping light device according to the above second preferred embodiment of the present invention, wherein the light element and the gripping handle have been connected.
Figure 16:
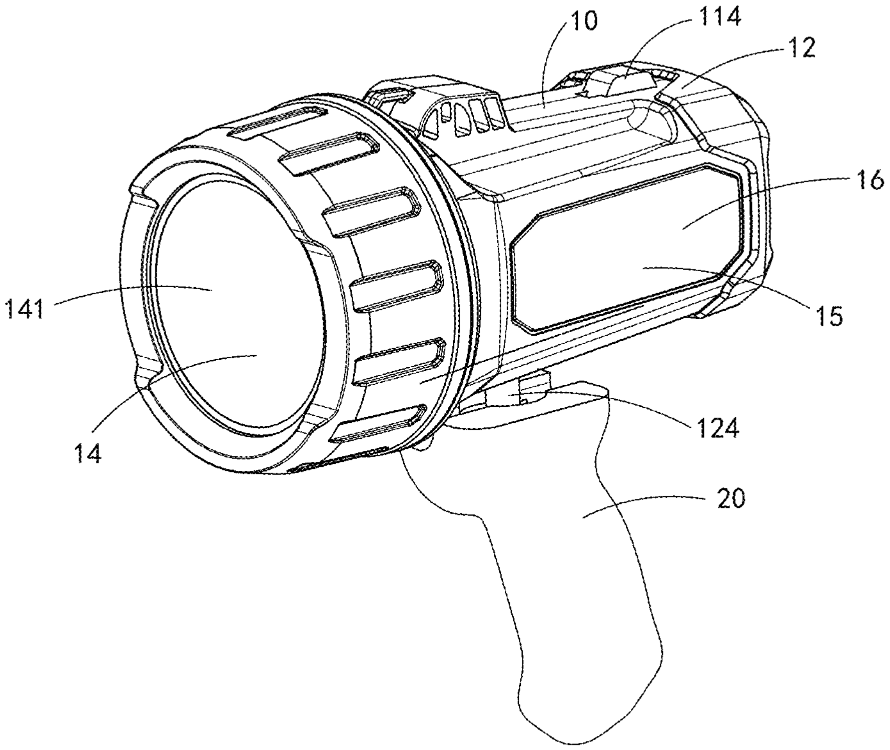
FIG. 16 is a perspective view of the longitudinally gripping light device according to a third preferred embodiment of the present invention.
Figure 17:
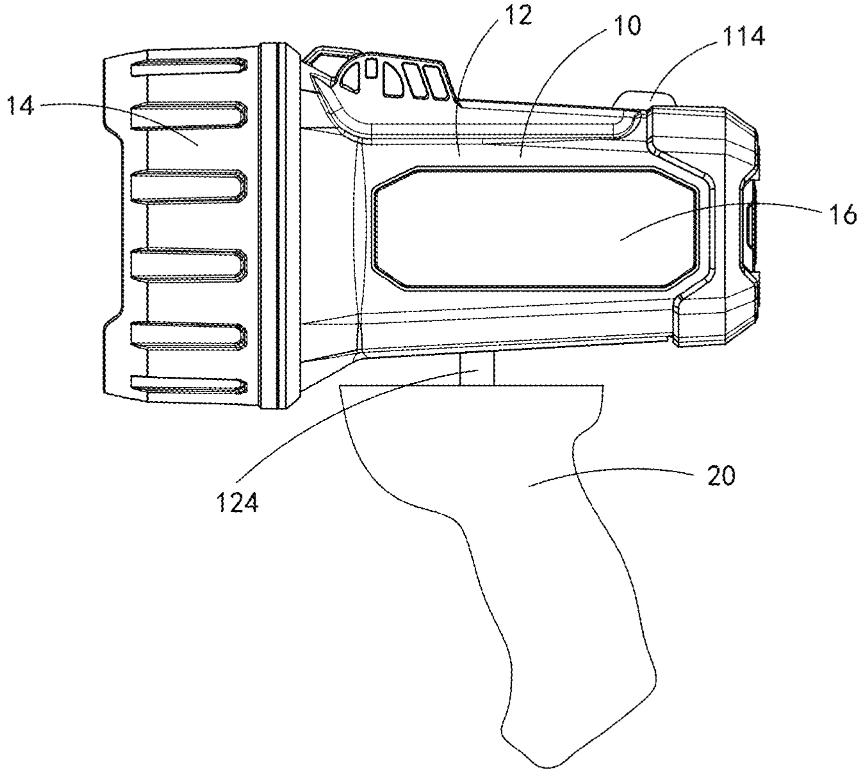
FIG. 17 is a side view of the longitudinally gripping light device according to the above third preferred embodiment of the present invention.

Referring to the FIG. 10 of the drawing, the electric connection part 1142 is arranged on the top side of the driving part 1141. The control switch 114 further comprises a positioning base 1143, a positioning element 1144, and a resetting element 1145, wherein the positioning base 1143 has one or more positioning slots 1146, the driving part 1141 has a keeping slot 1147, the driving part 1141 comprises a plurality of driving portions, which is adapted to slide in the corresponding positioning slot 1146, the positioning element 1144 is slid in the keeping slot 1147, wherein the positioning base 1143, the positioning element 1144 and the resetting element 1145 are fixed in the gripping handle 20, and the driving part 1141 is slidably arranged in the gripping handle 20. When the driving part 1141 is pressed to keep the positioning element 1144 being held at the end of the keeping slot 1147, it can be retained at the end of the keeping slot 1147, and the electric connection part 1142 is used to connect the relevant circuit to make the lamp source 11 and the auxiliary lamp source 15 being powered to be lighted. When the driving part 1141 is pressed again to remove the positioning element 1144 away from the end of the keeping slot 1147, the driving part 1141 is automatically reset under the action of the resetting element 1145.

The supporting device 30 comprises two supporting elements 31 respectively pivotally connected to the light housing 12 of the light element 10, and can be constructed in a manner which is adapted for angle adjustment, so that the supporting element 31 can be supported on an environmental surface, and the longitudinally gripping light device does not require a hand grip of the user.

More specifically, each of the supporting elements 31 comprises a pivot joint part 311 and a supporting body 312 connected to the pivot joint part 311, and the light housing 12 of the light element 10 comprises two joining parts 123, which are respectively pivotally connected to the pivot joint parts 311 of the supporting elements 31.

The joining part 123 has a fixing hole 1231 in the center, and a fixing groove 1232 on both sides respectively. The pivot joint part 311 comprises a fixing member 3111 in the center and a plurality of fixing teeth 3112 arranged along the circumference. The fixing member 3111 can be implemented as a fixing column. A plurality of fixing teeth 3112 is arranged on an annular inner surface with respect to each other in a spaced manner, and when the pivot joint part 311 is pivotally connected with the joining part 123, the two fixing teeth 3112 located on opposite sides can be positioned in two fixing grooves 1232, so that the pivot joint part 311 and the joining part 123 are maintained in a fixed state. While continuing to rotate the pivot joint part 311 with respect to the joining part 123, another set of the fixing teeth 3112 are located in two fixing grooves 1232, thus maintaining a predetermined angle between the supporting body 312 and the light housing 12.

One end of the light housing 12 of the light element 10 away from the lamp source 11 and two supporting bodies 312 of the supporting element 31 can be supported on the environmental surface to form a stable triangular supporting structure, so that the user does not need to hold the longitudinally gripping light device. And by adjusting the position of the fixing tooth 3112 of the pivot joint part 311 engaged with the fixing groove 1232, the supporting angle of the supporting device 30 for the light element 10 can be adjusted, so as to further adjust the lighting direction of the lamp source 11 and the auxiliary lamp source 15.

Referring to the FIGS. 16-19 of the drawings, a longitudinally gripping light device according to a third embodiment of the present invention is illustrated, wherein comprises a light element 10 and a gripping handle 20, wherein the gripping handle 20 arranged the bottom side of the light element 10 is connected to the light element 10 and is extended in a longitudinal direction for the user to hold the gripping handle 20 in a longitudinally gripping manner, so as to adjust the lighting direction of the light element 10 conveniently.

In this embodiment, similar to the two above embodiments, the light element 10 comprises the lamp source 11 and the auxiliary lamp source 15, wherein the lamp source 11 and the auxiliary lamp source 15 are adapted to provide different illumination light types, such as a converged light type and an astigmatic light type respectively.

The light element 10 is constructed to be rotatably assembled with the gripping handle 20 in this embodiment. More specifically, the light element 10 comprises a light housing 12, wherein the lamp source 11 and the auxiliary lamp source 15 are mounted on the light housing 12, the light housing 12 comprises a housing body 121 and a mounting element 124, wherein the light housing 12 is movably mounted on the gripping handle 20 through the mounting element 124.

More specifically, the mounting element 124 is rotatably mounted on the gripping handle 20, wherein the mounting element 124 comprises a connecting rod 1241 and a sphere 1242, the sphere 1242 is connected to the end of the connecting rod 1241, the gripping handle 20 comprises a fixing base 23, wherein the fixing base 23 has a fixing cavity 231, wherein the sphere 1242 is positioned in the fixing cavity 231 of the fixing base 23, and the sphere 1242 is in frictional contact with an inner surface 232 forming the fixed cavity 231, and the sphere 1242 is rotatable in the fixed cavity 231, so that the light housing 12 is rotatable with respect to the gripping handle 20, further to adjust the position of the light housing 12 causing one of the lamp source 11 and the auxiliary lamp source 15 is adjusted to a desired position, for example, adjusting one of the light source in front of the user. Specifically, for example, the lamp source 11 of the converging light type can be adjusted to emit light directly in front of the user, or the auxiliary lamp source 15 with the astigmatic type is provided to be adjusted to emit light directly in front of the user.

In this embodiment, in order to allow a rotatable operation of the light element 10 with respect to the gripping handle 20, the control switch 114 is adapted not to be arranged on the gripping handle 20 but on the light housing 12, and the user holds the gripping handle 20 by hand to hold the longitudinally gripping light device, then adjusts one of the light source to the desired position by rotating the light element 10, then can continue adjust this light source to the desired lighting direction by continuing to rotate the gripping handle 20.

Figure 18:
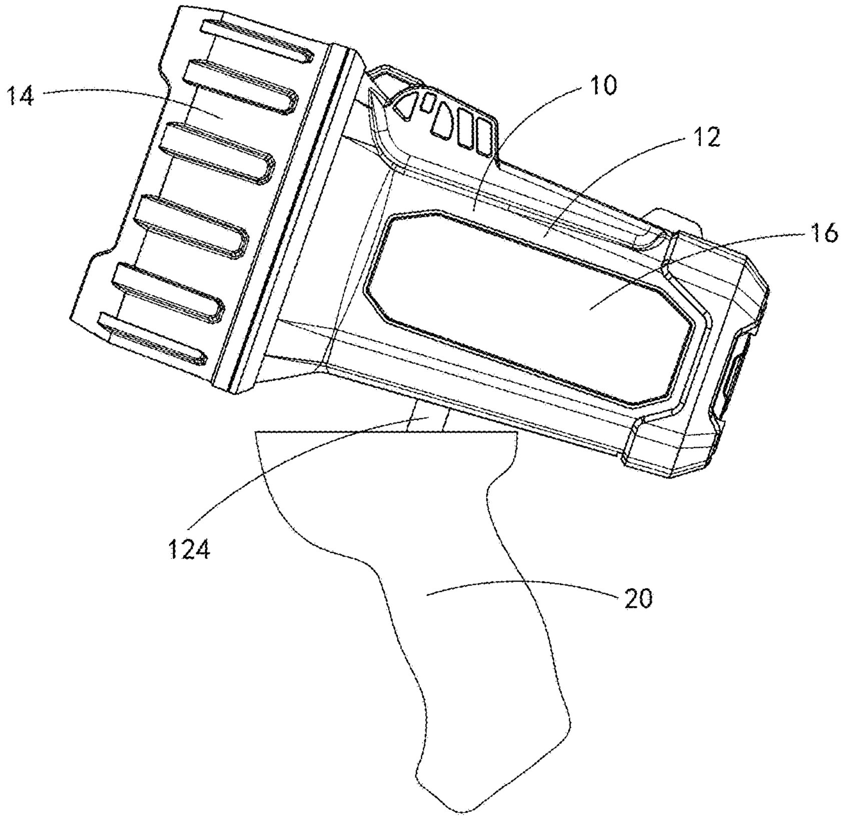
FIG. 18 is a structural schematic view illustrating the adjustment of the angle of the light element of the longitudinally gripping light device according to the above third preferred embodiment of the present invention.
Figure 19:
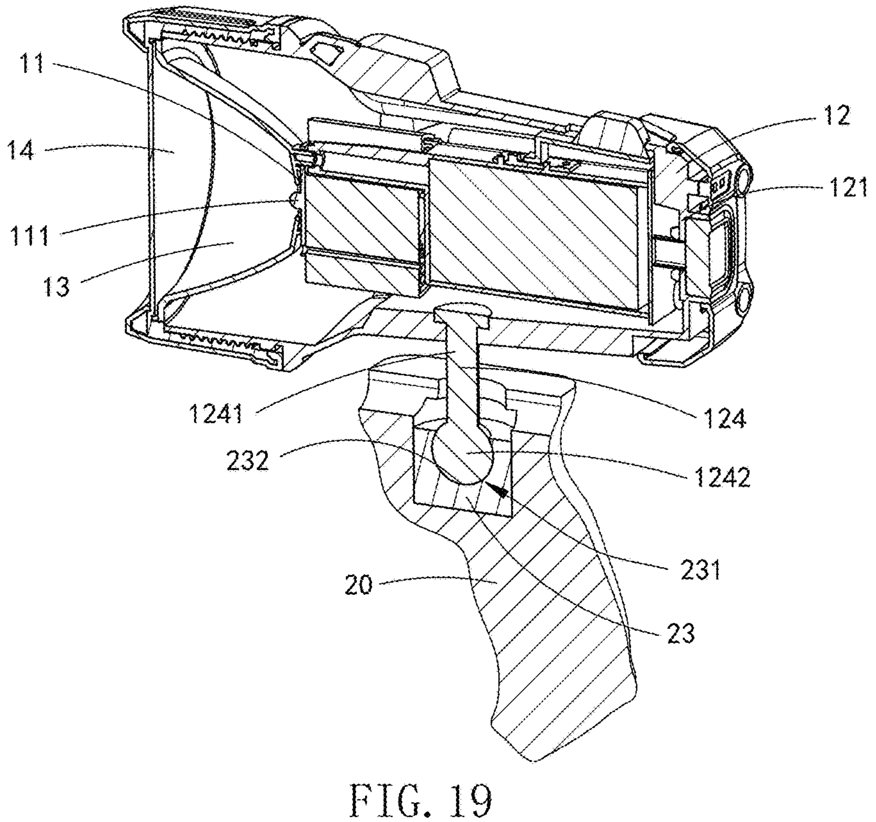
FIG. 19 is a sectional view of the longitudinally gripping light device according to the above third preferred embodiment of the present invention.
Figure 20:
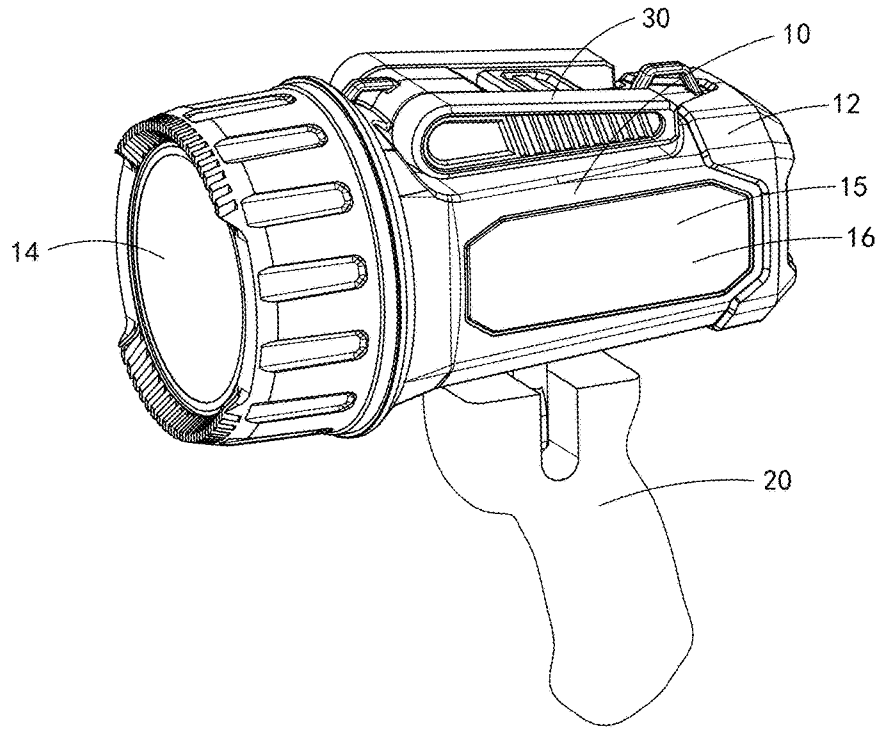
FIG. 20 is a perspective view of the longitudinally gripping light device according to a fourth preferred embodiment of the present invention.
Figure 21:
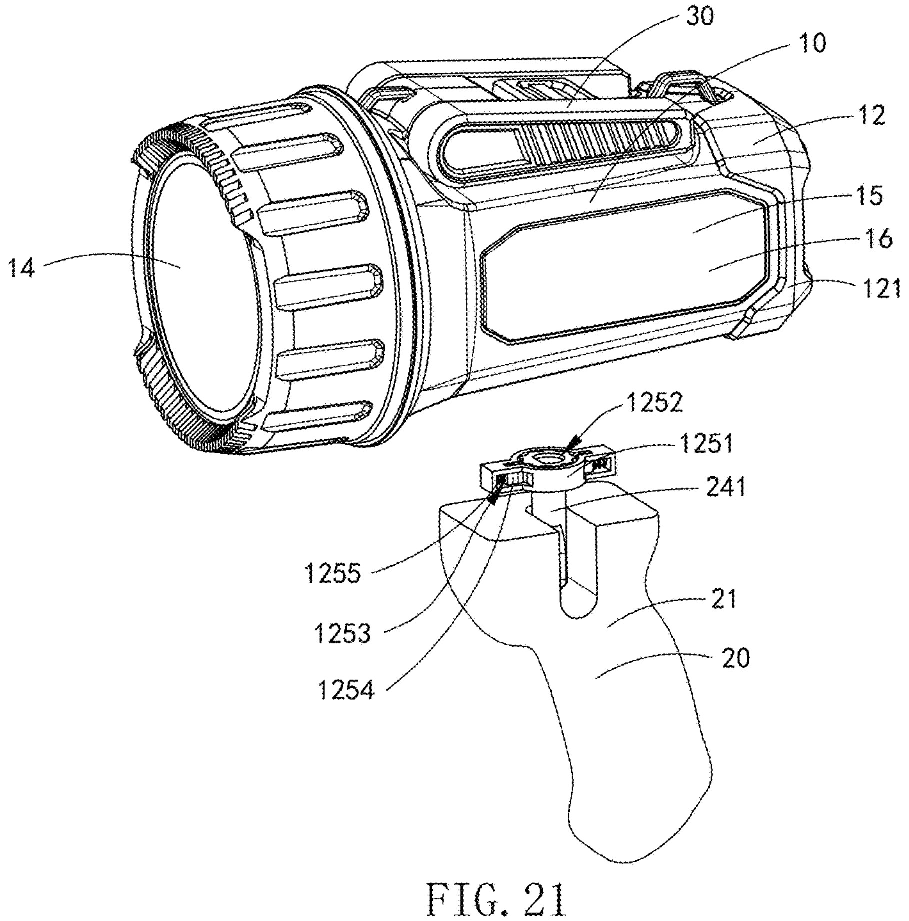
FIG. 21 is an exploded view of the longitudinally gripping light device according to the above forth preferred embodiment of the present invention.
Figure 22:
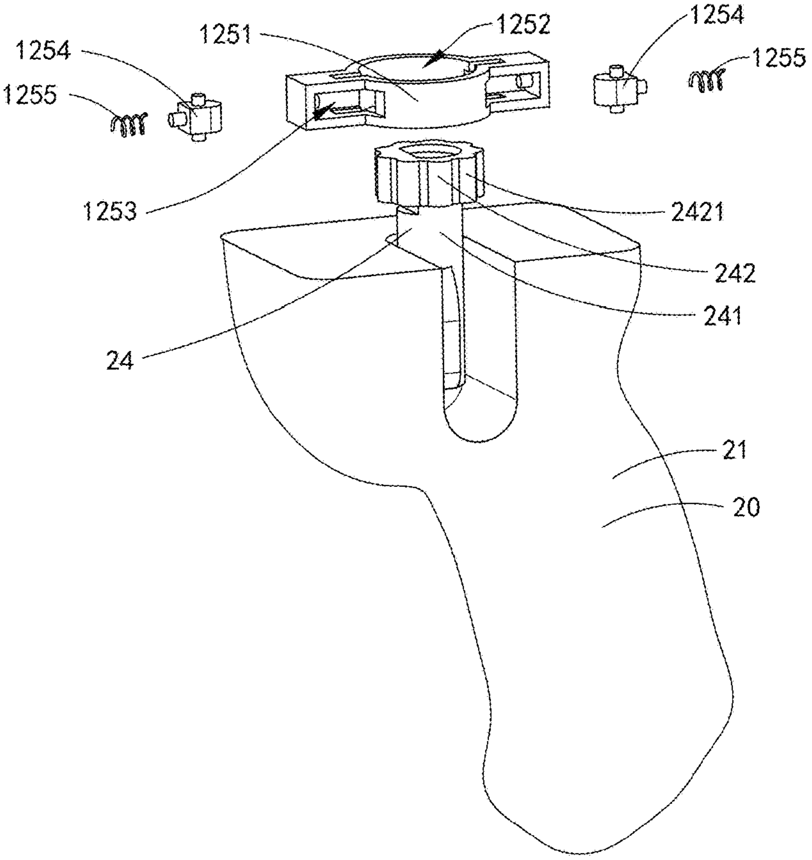
FIG. 22 is a schematic view illustrating the connection between the light element and the gripping handle of the longitudinally gripping light device according to the above forth preferred embodiment of the present invention.
Figure 23:
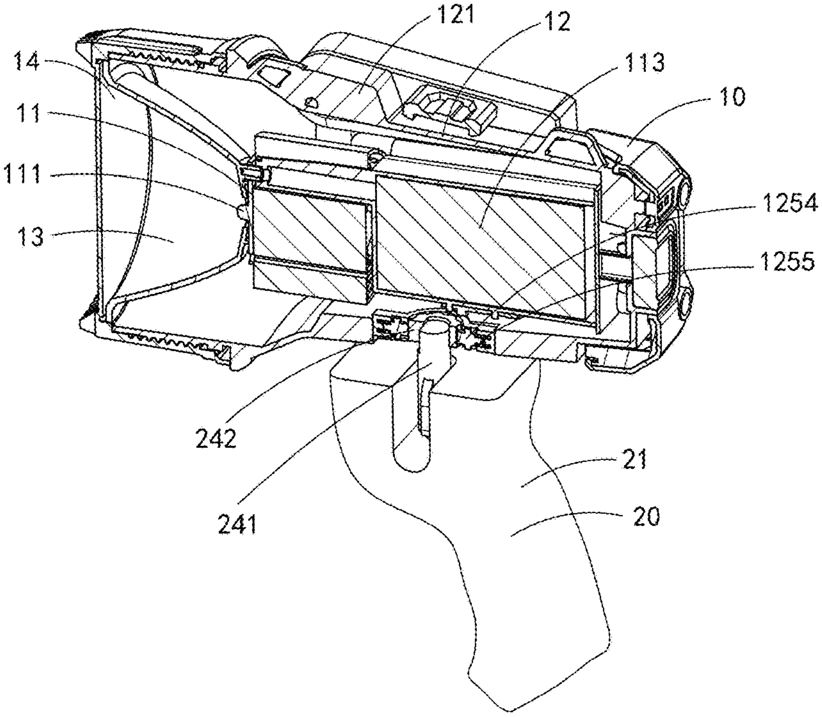
FIG. 23 is a section view of the longitudinally gripping light device according to the above forth preferred embodiment of the present invention.
Figure 24:
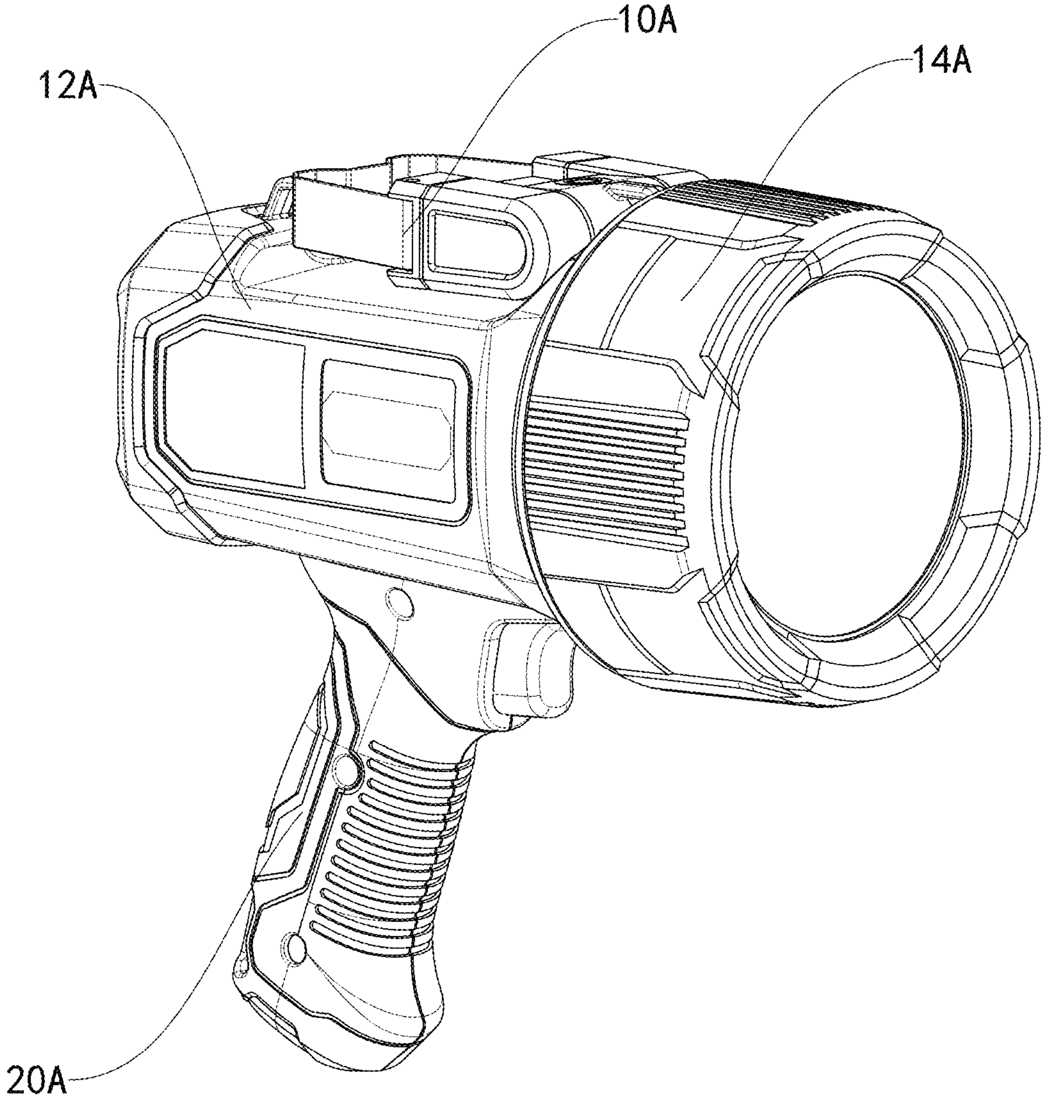
FIG. 24 is a perspective view of a longitudinally gripping light device according to a fifth preferred embodiment of the present invention.
Figure 25:
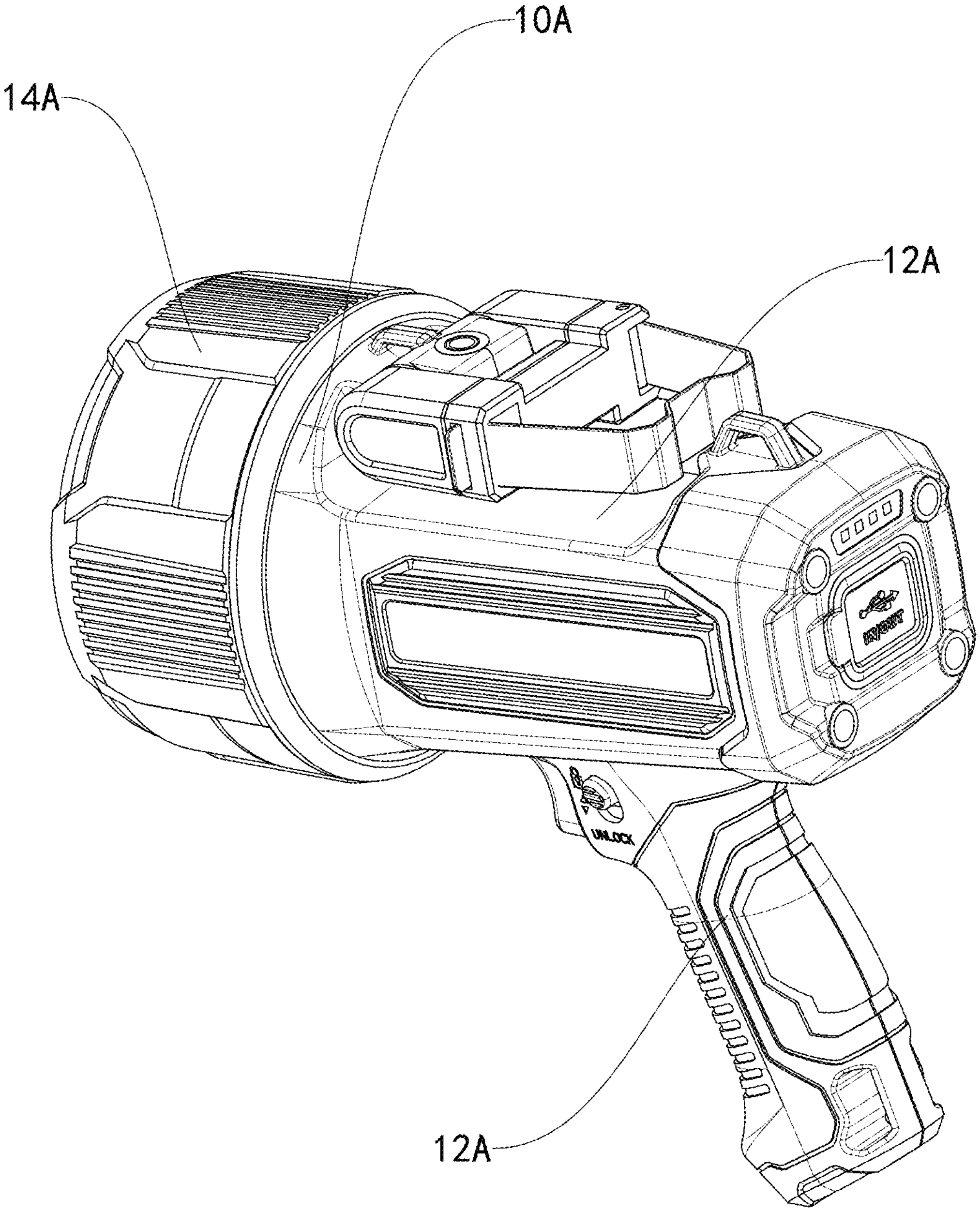
FIG. 25 is another perspective view of the longitudinally gripping light device according to the above fifth preferred embodiment of the present invention.
Figure 26:
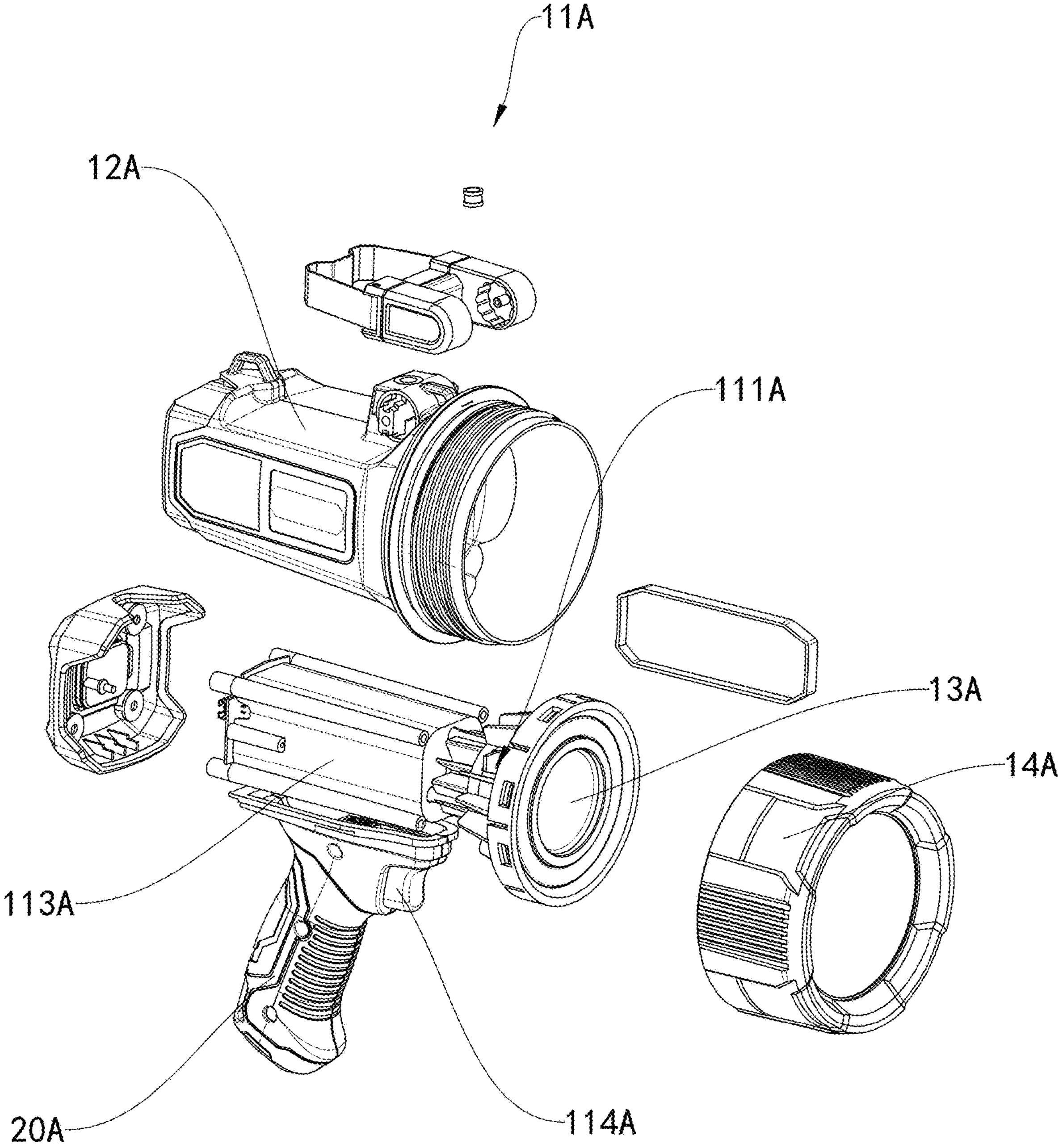
FIG. 26 is an exploded view of the longitudinally gripping light device according to the above fifth preferred embodiment of the present invention.
Figure 27:
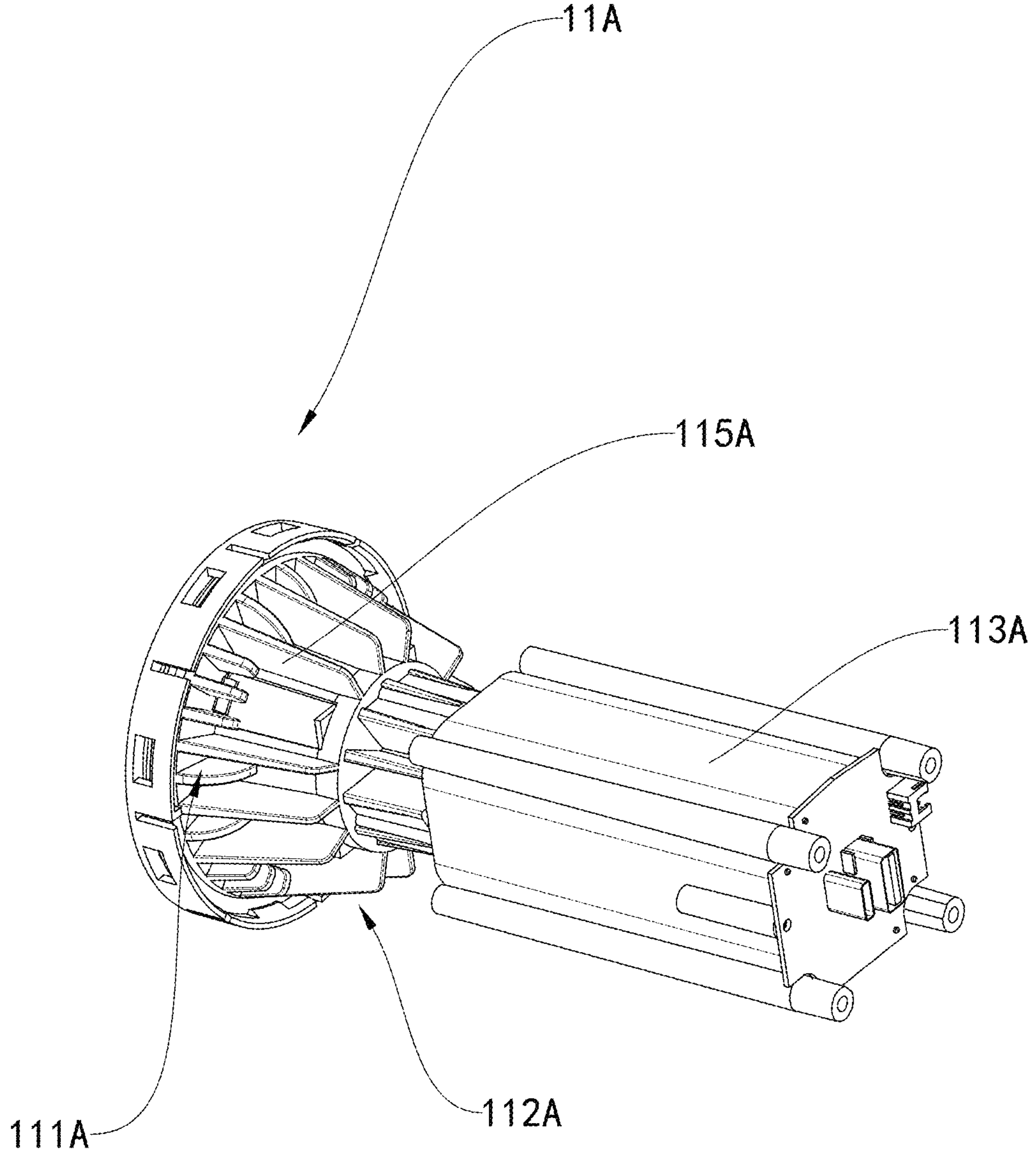
FIG. 27 is a partial structural schematic view of the longitudinally gripping light device according to the above fifth preferred embodiment of the present invention.
Figure 28:
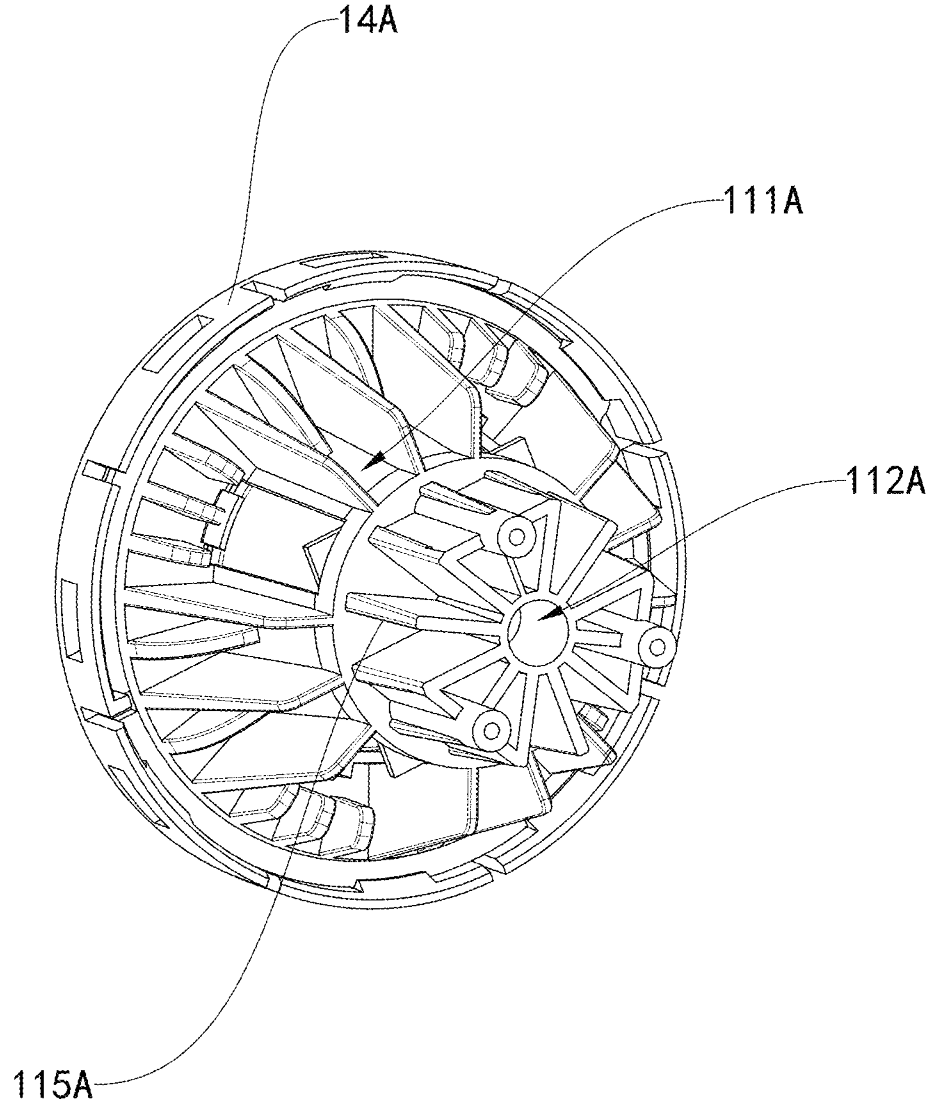
FIG. 28 is a structural schematic view of a heat dissipating structure of the longitudinally gripping light device according to the above fifth preferred embodiment of the present invention.

For example, the light element 10 can not only rotate 360 degrees on a horizontal plane, but also rotate up and down a predetermined angle, as shown in FIG. 18.

Referring to the FIGS. 20-23 of the drawings, a longitudinally gripping light device according to a fourth embodiment of the present invention is illustrated, wherein the longitudinally gripping light device comprises a light element 10 and a gripping handle 20, wherein the gripping handle 20 arranged on the bottom side of the light element 10 is connected to the light element 10 and is extended in a longitudinal direction for the user to hold the gripping handle 20 in a longitudinally gripping manner, so that it is convenient to adjust the lighting direction of the light element 10.

In this embodiment, similarly to the above three embodiments, the light element 10 comprises the lamp source 11 and the auxiliary lamp source 15 which are adapted to provide different illumination light types, such as a converged light type and an astigmatic light type respectively.

The light element 10 is constructed to be rotatably assembled with the gripping handle 20 in this embodiment. More specifically, the light element 10 comprises a light housing 12, wherein the lamp source 11 and the auxiliary lamp source 15 are mounted on the light housing 12, the light housing 12 comprises a housing body 121 and an assembly element 125, wherein the light housing 12 is movably mounted on the gripping handle 20 through the assembly element 125.

More specifically, the assembly element 125 arranged on the bottom side of the housing body 121 comprises an assembly base 1251, wherein the assembly base 1251 is connected to the housing body 121 and has an assembly hole 1252 in the center. The assembly base 1251 is also provided with two limit slots 1253 on opposite sides of the assembly hole 1252, each limit slot 1253 is arranged with a compression part 1254 and a reset spring 1255. The top side of the gripping handle 20 is connected with an assembly part 24 which comprises an assembly rod 241 and a rotating gear 242, wherein the rotating gear 242 is connected to the end of the assembly rod 241 and comprises a plurality of positioning teeth 2421 which are arranged with respect to each other in a spaced manner.

The rotating gear 242 is arranged in the assembly hole 1252 of the assembly element 125 of the light element 10, so that the gripping handle 20 is assembled with the light element 10. Each compression part 1254 is pressed against the rotating gear 242 under the elastic force of the reset spring 1255, thereby fixing the relative position of the rotating gear 242 and the assembly base 1251. When the relative position of the light element 10 and the gripping handle 20 is needed to be adjusted, the assembly base 1251 is rotated relative to the rotating gear 242, so that the light element 10 is rotated a predetermined angle relative to the gripping handle 20. When the light element 10 is rotated to allow one of the light sources to the desired position and the user releases the operating hand, the elastic reset force of the reset spring 1255 causes the pressure member 1254 to be re-pressed against the circumflex surface of the rotating gear 242 to prevent further rotation of the rotating gear 242 by a friction force. Thus, the relative position between the assembly base 1251 and the rotating gear 242 is fixed, in such a manner that the position of the light element 10 is fixed, so that a light source such as the auxiliary light source is adjusted to the required lighting direction.

Referring to the FIGS. 24-28 of the drawings, a longitudinally gripping light device according to a fifth preferred embodiment of the present invention is illustrated. In this embodiment, the longitudinally gripping light device is a heat dissipating integrated light device, wherein the longitudinally gripping light device comprises a light element 10A and a gripping handle 20A, and the gripping handle 20A is longitudinally and detachably connected to the light element 10A for the user to hold the gripping handle 20A in a longitudinally gripping manner, thus facilitating the adjustment of the lighting direction of the light element 10A.

The light element 10A comprises one or more lamp sources 11A, a light housing 12A, a reflector 13A and an output lens 14A, wherein the lamp source 11A, the reflector

13A and the output lens 14A are mounted on the light housing 12A, thereby assembling into the light element 10A. The gripping handle 20A is longitudinally connected to the light housing 12A of the light element 10A for the user to hold.

The lamp source 11A comprises one or more lighting members 111A, a control circuit board 112A, a power module 113A, a control switch 114A and at least one cooling fin 115A. The lighting member 111A is adapted to be a variety of light sources that can emit light, such as LED, OLED, fluorescent lights, etc. The lighting member 111A is electrically connected to the control circuit board 112A and the power module 113A. When the control switch 114A is operated, the lighting member 111A is illuminated under the control of the control circuit 113A and the provision of the power supply by the power module 113A. The cooling fin 115A is connected to the control circuit board 112A to dissipate the heat generated by the lighting member 111A in time.

In the present embodiment, the cooling fin 115A is die-cast and integrated, thus making assembly simpler and cost lower. The conventional heat dissipating element is processed by the turning machining mill, which has many accessories, is with trouble assembling and is without combining the Cob board and the main light.

It is worth mentioning that in the process of using the light element 10A, the lamp source 11A will also generate heat during emitting light, if the heat is not dispersed in time, along the extension of the lighting time, it will damage the light element 10A and reduce its service life. Therefore, in this embodiment, the cooling fin 115A is arranged inside the light housing 12A, if the cooling fin 115A is not arranged, the heat emitted by the lamp source 11A is transmitted to the light housing 12A through the air, the efficiency is relatively low, and once the heat is saturated, the power is reduced, such that the service life of the LED light is achieved, causing that the LED lights have a short service life.

Under the action of the cooling fin 115A in this embodiment, the heat can be efficiently transferred out, which is benefit for prolonging the service life of the light element 10A, also the manufacturing process is simple, the assembly is convenient, and the cost is low.

Referring to the FIGS. 29-33 of the drawings, an focus adjustable pistol type spotlight 6100 according to a sixth preferred embodiment of the present invention is illustrated, wherein the focus adjustable pistol type spotlight 6100 comprises a mounting main housing 610, a light source assembly 620 and a lens assembly 630. The mounting main housing 610 has a pistol configuration structure and at least one receiving cavity 6101 located therein. The mounting main housing 610 is adapted to be a single-layer housing or a multi-layer housing, wherein in a specific example of this present invention, the mounting main housing 610 comprises a receiving housing 611 and an outer covering housing 612 arranged at an outer side of a partial area of the receiving housing 611, wherein the receiving housing 611 forms the receiving cavity 6101 therein, the outer covering housing 612 is adapted to be matched with the receiving housing 611 to form an expected shape, and the receiving housing 611 and the outer covering housing 612 can be designed in different colors to form the expected color matching pattern. It is worth mentioning that the "pistol type" of the focus adjustable pistol type spotlight 6100 mentioned in this embodiment of the present invention mainly refers to the overall configuration of the light is similar to that of a pistol, and does not have the function of a pistol.

In this embodiment of the present invention, the pistol structure of the mounting main housing 610 comprises a barrel part 6110 and a gripping part 6120, wherein the gripping part 6120 is inclinedly extended from the barrel part 6110, and the overall shape of the barrel part 6110 and the gripping part 6120 is with the pistol configuration. The barrel part 6110 and the gripping part 6120 is adapted to be with an integrate structure or a split structure, which is not limited by this application.

The light source assembly 620 mounted on the mounting main housing 610 comprises at least one lighting body 625, and the lens assembly 630 located on the exit path of the light source assembly 620 comprises a lens barrel 633 and at least one lens 631 installed in the lens barrel 633. In some embodiment modes, the lens assembly 630 further comprises a lens mounting body 632, wherein the lens mounting body 632 has a light hole 6301 corresponding to the lighting body 625, the lens 631 is mounted on the lens mounting body 632, the lens barrel 633 is covered at an outer side of the lens mounting body 632 and the lens 631. In this embodiment of the present invention, taking the direction of light emission as the front, the central axis of the light emitted by the lighting body 625 is set as the optical axis of the light source assembly 620.

In theory, focus adjusting can be achieved by moving the lens 631 in the lens assembly 630. However, in the pistol type spotlight, the lens assembly 630 is mounted in front of the light source assembly 620, the displacement range of the lens 631 in the lens assembly 630 is between the most front end of the lens barrel 633 and the light source assembly 620, and the displacement stroke of the lens 631 is mainly dependent on the length of the lens barrel 633. In general, the length of the lens barrel 633 of the lens assembly 630 is shorter, resulting in a shorter displacement stroke of the lens 631 in the housing of the lens assembly 630, thereby allowing a larger range of focusing. In order to increase the adjustable focusing length range, it is necessary to extend the length of the lens barrel 633, or to extend the length of the part of the mounting main housing 610 for mounting the light source assembly 620, and to totally install the light source assembly 620 in the mounting main housing 610, which will increase the overall volume of the pistol spotlight.

Based on this, this application achieves focus adjusting by moving the lighting body 625. In particular, the light source assembly 620 is mounted on the mounting main housing 610, and the receiving cavity 6101 of the mounting main housing 610 itself may provide a longer displacement stroke for the lighting body 625 and/or the movable part for mounting the lighting body 625, such that the displacement stroke can be extended without increasing the overall volume of the pistol type spotlight as much as possible. Accordingly, in this embodiment of the present invention, at least one of the lighting bodies 625 is mounted on the mounting main housing 610 along the optical axis set by the light source assembly 620 in a movable manner such that the lighting bodies 625 can move with respect to the lens assembly 630.

Figure 29:
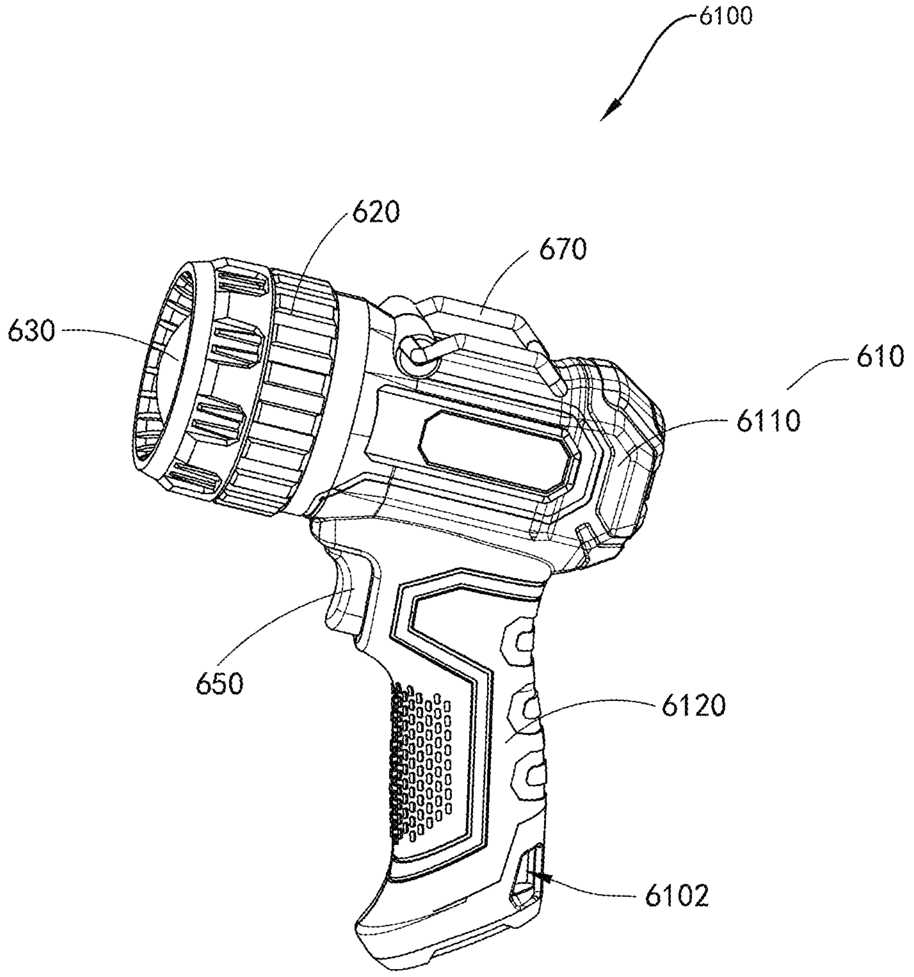
FIG. 29 is a perspective view of a focus adjustable handheld spotlight according to a sixth preferred embodiment of this present invention.
Figure 30:
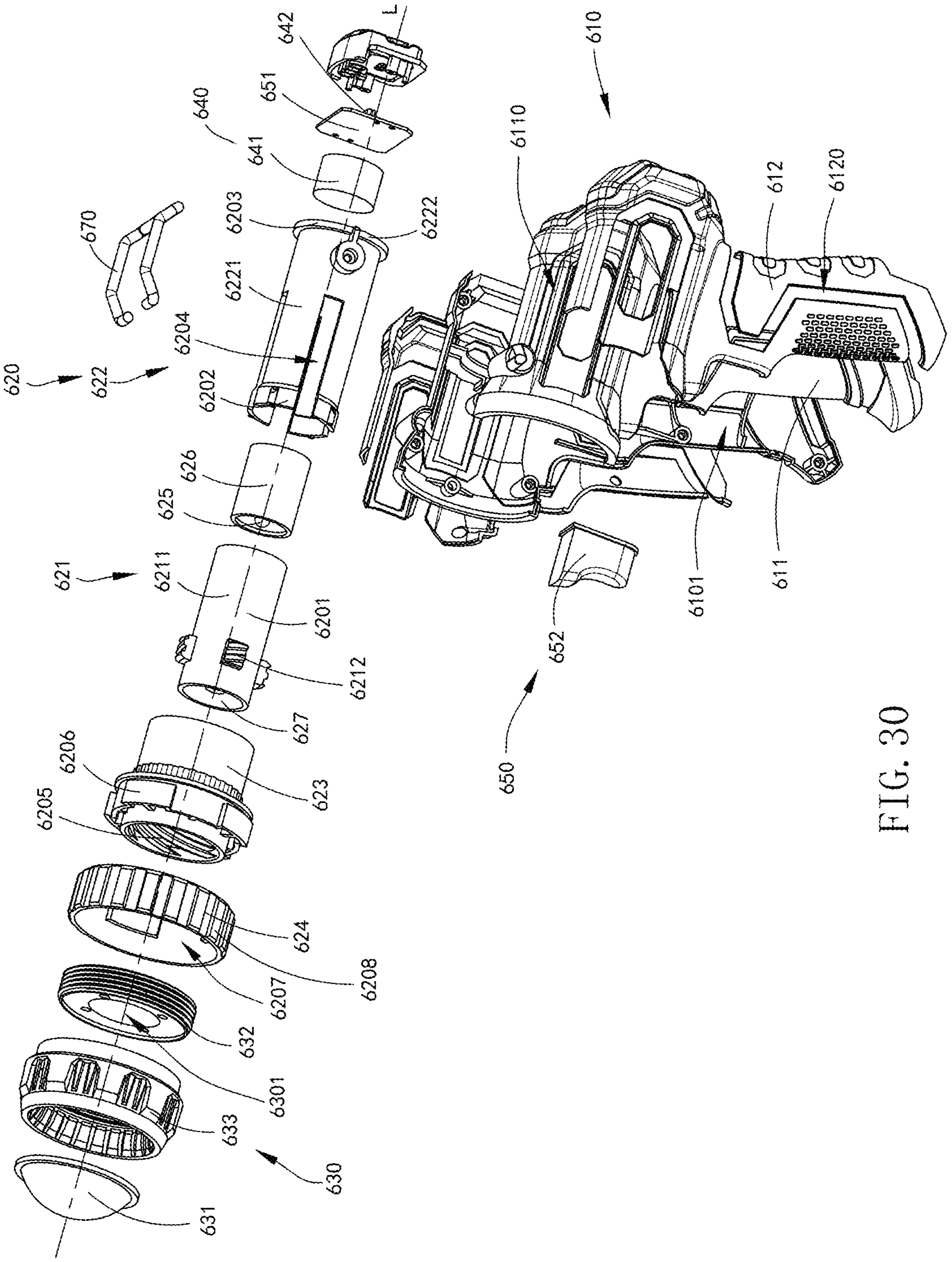
FIG. 30 an exploded view of the focus adjustable handheld spotlight according to the sixth preferred embodiment of this present invention.

Referring to FIG. 29 of the drawing, the light source assembly 620 is mounted on the barrel part 6110 of the mounting main housing 610. Optionally, the optical axis set by the light source assembly 620 is consistent with the central axis of the barrel part 6110, that is, the light source assembly 620 is coaxial with the barrel part 6110. The light source assembly 620 further comprises a driving inner barrel 621 and a driving outer barrel 623. The driving outer barrel 623 is covered at an outer side of the driving inner barrel

621, the driving inner barrel 621 is mounted on the driving outer barrel 623 along the optical axis set by the light source assembly 620 in a movable manner, and the lighting body 625 is installed on the driving inner barrel 621. Thus, the driving inner barrel 621 is served as a movable part for mounting the lighting body 625 and drives the lighting body 625 to move respect to the lens assembly 630 during its movement along the optical axis set by the light source assembly 620 in the driving outer barrel 623.

In this embodiment of the present invention, the light source assembly 620 further comprises an optical bowl 627 having a curved surface structure and covered at an outer side of the periphery of the lighting body 625 for converging light. The optical bowl 627 is extended forward from the lighting body 625 in a gradual expanding manner. The optical bowl 627 and the driving inner barrel 621 can be an integrated structure, that is, the optical bowl 627 and the driving inner barrel 621 are integrated formed or connected in one piece, and the optical bowl 627 and the driving inner barrel 621 can also be split structures that are assembled with each other.

It is worth mentioning that, alternatively, the lens mounting body 632 is adapted to be fixed on the driving outer barrel 623 or the mounting main housing 610. That is, the lens mounting body 632 itself does not move in the direction of the optical axis set by the light source assembly 620, and the application can only move the movable part of the light source assembly 620 to change the distance between the lens mounting body 632 and the optical axis at the light source assembly 620 set by the lens assembly 630, so as to achieve adjusting focus. It shall be understood that focus adjusting is also adapted to be achieved by other means, for example, by moving the distance between the moving part in the light source assembly 620 and the moving part in the lens assembly 630 to change the distance between the moving part in the light source assembly 620 and the optical axis in the light source assembly 620 set by the lens assembly 630 so as to achieve adjusting focus.

At least part of the driving outer barrel 623 and at least part of the driving inner barrel 621 are contained in the receiving cavity 6101 of the mounting main housing 610 in such a manner that the longer displacement stroke is provided for the driving inner barrel 621 by means of the receiving cavity 6101 of the mounting main housing 610.

In this embodiment of the present application, the specific implementation modes of the lighting body 625 and its installation in the driving inner barrel 621 are not limited by the present application. For example, the lighting body 625 can be implemented as an LED light bead, a light strip, etc. The lighting body 625 is adapted to be directly fixed in the driving inner barrel 621, for example, be connected to the driving inner barrel 621 in a fused manner, be directly put up on the driving inner barrel 621, or indirectly mounted in the driving inner barrel 621 by means of other intermediate mounting bodies. In a specific embodiment of this application, the light source assembly 620 further comprises a light source mounting body 626 mounted in the driving inner barrel 621 and the optical bowl 627, the light source mounting body 626 is installed in the driving inner barrel 621, the lighting body 625 is installed in the light source mounting body 626 and extended out of the driving inner barrel 621.

In this embodiment of the present application, the moving mode of the driving inner barrel 621 in the outer barrel is not limited by this application, such as by rotating movement and pulling movement. In a specific mode of the present application, the driving inner barrel 621 has external threads 6201 located on its surface, and the driving outer barrel 623 has internal threads 6205 located on its inner wall to enable the driving inner barrel 621 to move within the driving outer barrel 623, further to carry the lighting body 625 moving with respect to the lens assembly 630.

In the specific mode, the driving outer barrel 623 is mounted on the mounting main housing 610 in a rotatable manner along the optical axis set by the light source assembly 620, and the driving outer barrel 623 is immovable in the direction of the optical axis set by the light source assembly 620 so that during the process of being rotated of the driving outer barrel 623, the driving inner barrel 621 is moved along the optical axis set by the light source assembly 620 in the driving outer barrel 623 and drives the lighting body 625 to move with respect to the lens assembly 630.

In the specific mode, the light source assembly 620 further comprises an operating sleeve 624 covered at an outer side of the driving outer barrel 623 for the user to use conveniently. Preferably, the outer surface of the operating sleeve 624 is substantially aligned with the partial outer surface of the barrel part 6110 adjacent to the operating sleeve 624, the outer surface of the lens barrel 633 is substantially aligned with the partial outer surface of the operating sleeve 624 adjacent to the lens barrel 633, such that the overall outline of the focus adjustable pistol type spotlight 6100 is more beautiful and smoother.

The operating sleeve 624 is fixed with respect to the driving outer barrel 623 in the circumferential direction of the driving outer barrel 623, that is, the operating sleeve 624 cannot substantially move along the circumferential direction of the driving outer barrel 623. When the operating sleeve 624 is rotated, the driving outer barrel 623 is rotated, such that the driving inner barrel 621 is moved along the optical axis of the light source assembly 620. That is, the user can realize the movement of the driving inner barrel 621 by rotating the operation sleeve 624, and then realize the relative distance between the lighting body 625 installed in the driving inner barrel 621 and the lens assembly 630 to achieve focus adjusting.

In particular, in this specific mode, the driving outer barrel 623 comprises at least one limiting protrusion 6206 protruded from its peripheral surface, the operating sleeve 624 has at least one internal groove 6207 corresponding to the limiting protrusion 6206, and the limiting protrusion 6206 is embedded in the internal groove 6207, by such a way, the operating sleeve 624 is basically not able to move along the circumference of the driving outer barrel 623. Alternatively, the peripheral surface of the operating sleeve 624 is provided with a plurality of external protrusions 6208 for increasing the friction force so that the user is not easy to slip off during rotating the operating sleeve 624.

Figure 33:
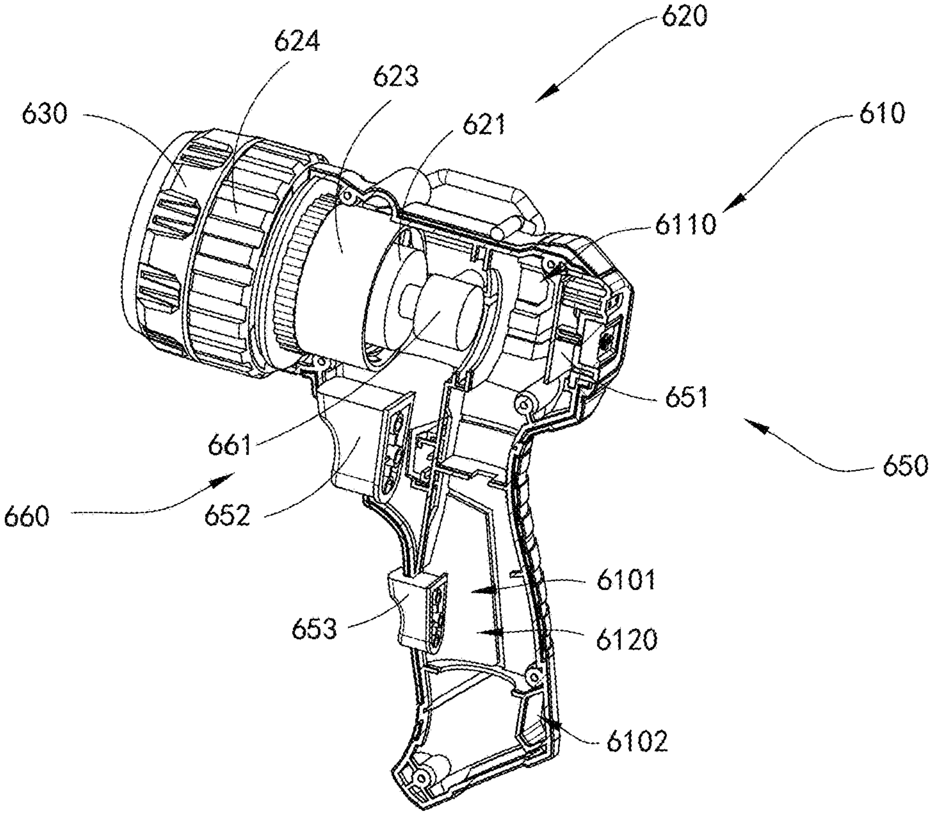
FIG. 33 a partial exploded view of the focus adjustable handheld spotlight according to an alternative mode of the sixth preferred embodiment of this present invention.
Figure 34:
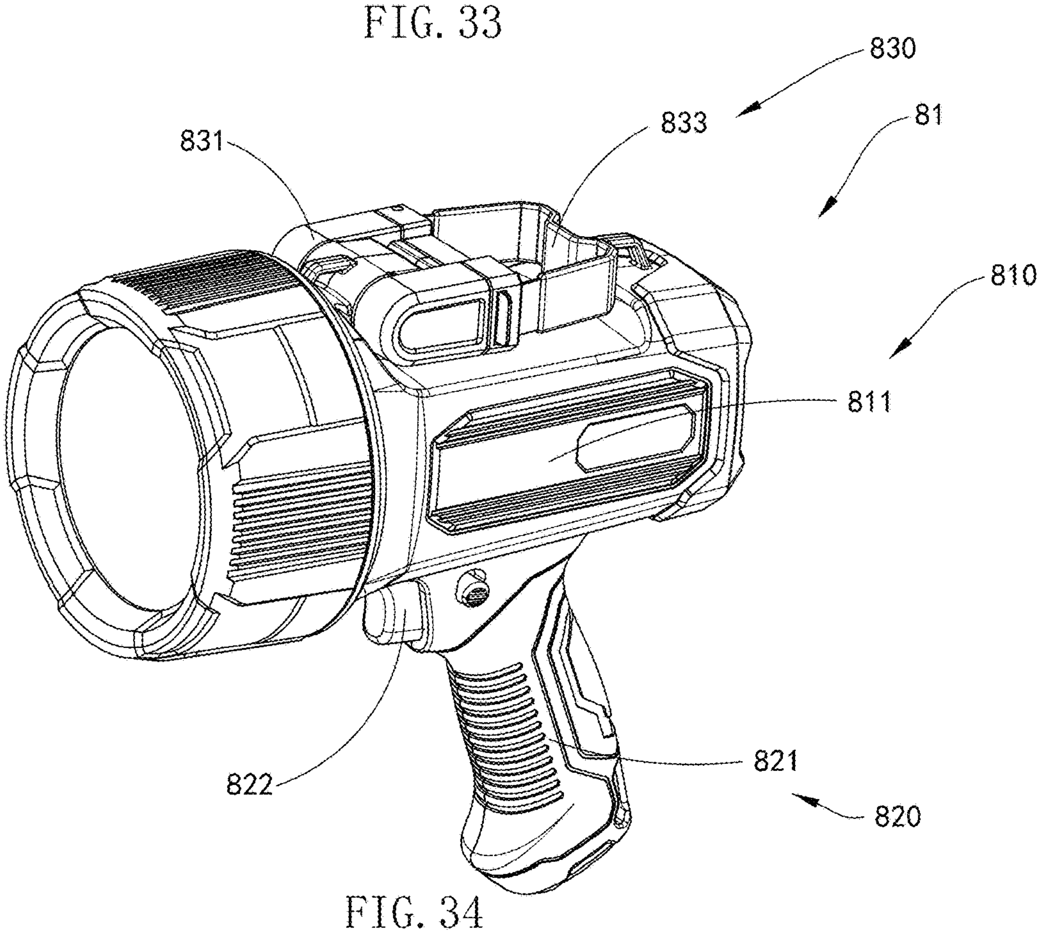
FIG. 34 is an overall perspective view of a swivel hook handheld light according to a seventh preferred embodiment of the present invention.
Figure 35:
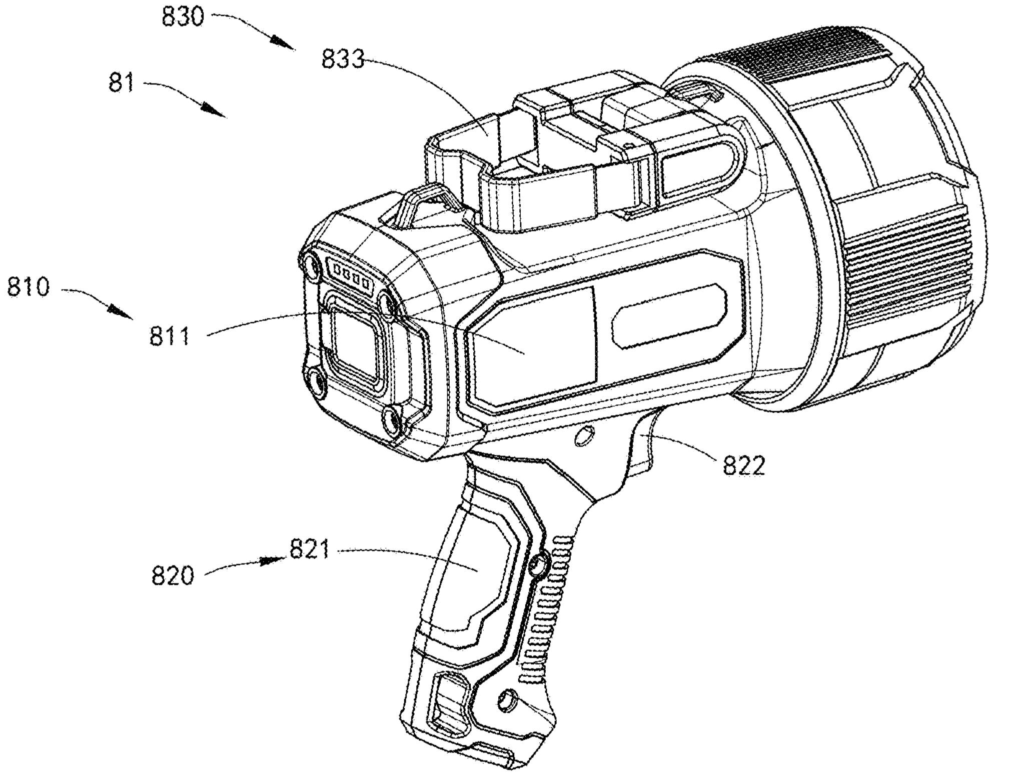
FIG. 35 is another overall perspective view of the swivel hook handheld light according to the seventh preferred embodiment of the present invention.
Figure 36:
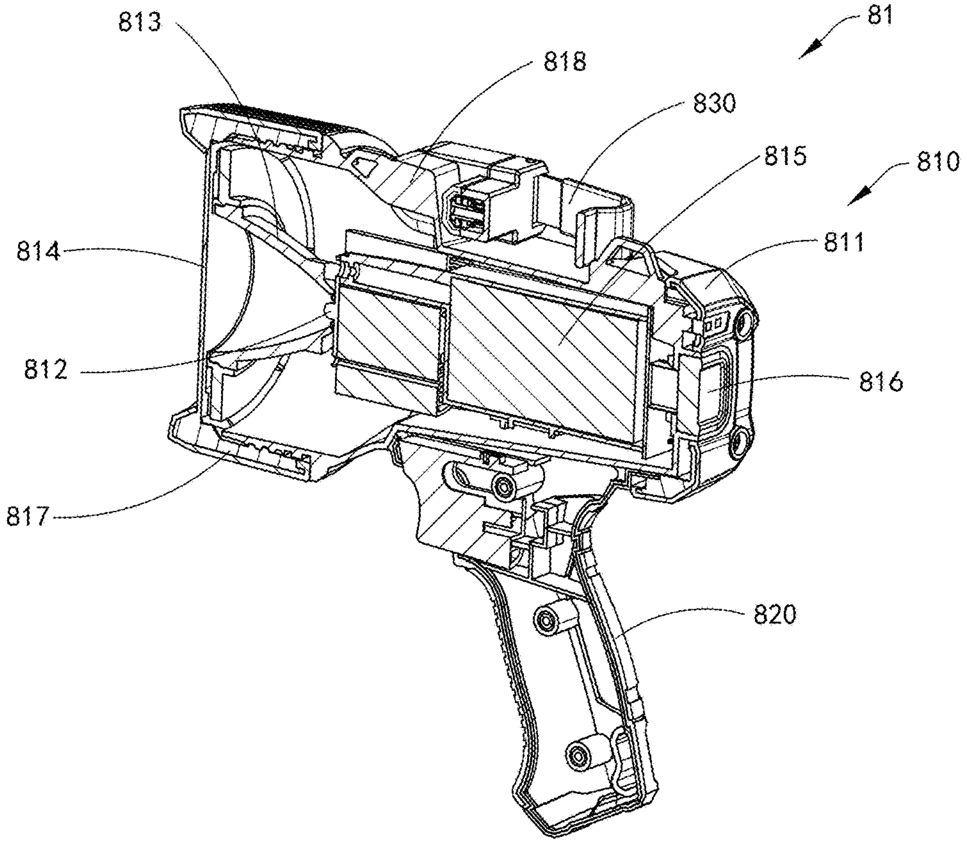
FIG. 36 is a section view of the swivel hook handheld light according to the seventh preferred embodiment of the present invention.

In the modified embodiment of the specific mode, the movement of the driving inner barrel 621 can also be achieved by a driving motor 661, as shown in FIG. 33. Specifically, in the deformation embodiment, the focus adjustable pistol type spotlight 6100 further comprises a driving assembly 660 and a driving control unit 653 controllably connected to the driving assembly 660. The driving assembly 660 comprises the driving motor 661 connected to the driving inner barrel 621 in a manner which is able to transmit driving. Alternatively, the driving assembly 660 further comprises a driving member connected between the driving inner barrel 621 and the driving motor 661 in a manner which is able to transmit driving. The driving control unit 653 can be a rotating control unit, a pressing control unit, a rocker control unit, or other control units with other types.

It is worth mentioning that the focus adjustable pistol type spotlight 6100 can be designed to be stepless focus or to be grading focus.

In this embodiment of the present invention, the light source assembly 620 further comprises a guiding member mounted on the driving inner barrel 621 for guiding the driving inner barrel 621 to move along the optical axis set by the light source assembly 620, such that the driving inner barrel 621 can move more stably along the optical axis set by the light source assembly 620. The specific implementation mode of the guiding member is not limited by this application.

In a specific implementation mode of the present invention, the guiding member is implemented as a guiding inner barrel 622. In particular, the light source assembly 620 further comprises a guiding inner barrel 622 covered at an outer side of the driving inner barrel 621, the driving inner barrel 621 comprises an inner barrel body 6211 and at least one fixing protrusion 6212 formed on the outer surface of the inner barrel body 6211. The guiding inner barrel 622 has at least one guiding groove 6204 corresponding to the fixing protrusion 6212, and the extension direction of at least part of the guiding groove 6204 is consistent with the optical axis set by the light source assembly 620, and the fixing protrusion 6212 can be arranged in the guiding groove 6204 in a slidable manner.

Alternatively, the driving inner barrel 621 comprises a plurality of fixing protrusions 6212 arranged with respect to each other in a spaced manner, and the plurality of the guiding inner barrel 622 have the plurality of the guiding groove 6204 corresponding to the plurality of fixing protrusion 6212. The external thread 6201 of the driving inner barrel 621 is formed on the outer surface of the fixing protrusion 6212.

The guiding inner barrel 622 comprises a first end 6202 and a second end 6203, and further to be optional, the guiding groove 6204 is extended from the first end 6202 of the guiding inner barrel 622 to the second end 6203 of the guiding inner barrel 622, forming a groove at the first end 6202 of the guiding barrel. Thus, the driving inner barrel 621 can slide along the guide groove 6204 to the first end 6202 of the guiding inner barrel 622 to be removed from the groove so as to be detached from the guiding inner barrel 622.

Figure 32:
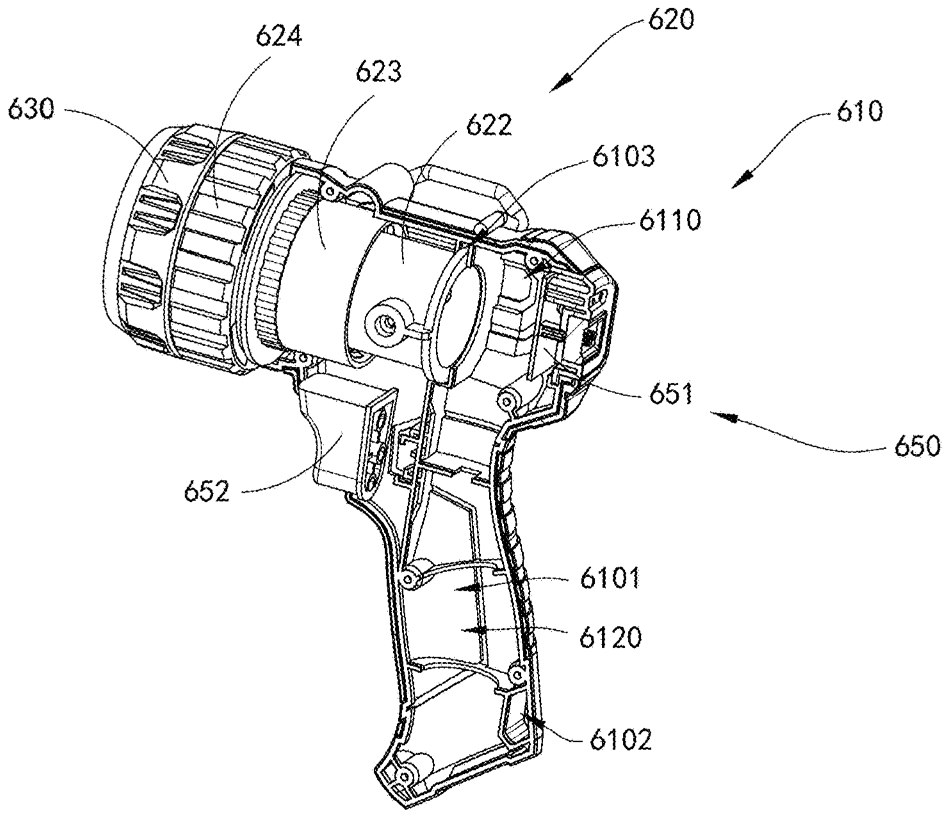
FIG. 32 a partial exploded view of the focus adjustable handheld spotlight according to the sixth preferred embodiment of this present invention.

In this embodiment of the present invention, the guiding inner barrel 622 is fixed to the mounting main housing 610 in the direction of the optical axis set by the light source assembly 620. In particular, the guiding inner barrel 622 comprises a barrel body 6221 and a protruding edge 6222 protruded and formed on the peripheral surface of the barrel body 6221, and the receiving housing 611 has a slot 6103 corresponding to the protruding edge 6222. The protruding edge 6222 of the guiding inner barrel 622 is stuck in the slot 6103, as shown in FIG. 32, such that the guiding inner barrel 622 is immovable with respect to the mounting main housing 610 in the optical axis direction set by the light source assembly 620.

In the modified implementation mode of the present application, the guiding member is adapted to be implemented as other structures. For example, the driving inner barrel 621 is provided with an outer groove indented into the outer peripheral surface, and the guiding inner barrel 622 is provided with an inner guiding rail matched with the outer groove, so that the driving inner barrel 621 can be moved along the inner guiding rail. For another example, the driving inner barrel 621 is provided with an outer groove indented into the outer peripheral surface, and the guiding member is implemented as a guiding rod extended from the inner wall of the mounting main housing 610 to the outer groove, such that the driving inner barrel 621 can be moved along the guiding rod.

In the implementation mode of the present invention, the focus adjustable pistol type spotlight 6100 further comprises a power supply component 640 electrically connected to at least one of the lighting bodies 625 for supplying power to the lighting body 625. Specifically, the focus adjustable pistol type spotlight 6100 can be powered by a dry battery, can be powered by a rechargeable battery, and can also be directly connected to an external power supply through an electrical connection port 642 for supplying power.

In the implementation mode of the present invention, the power supply component 640 comprises at least one electrical connection port 642 for connecting to the external power supply and is also adapted to be used for connecting to other external devices. Optionally, the power supply assembly 640 further comprises at least one battery 641, wherein the battery 641 is connected to the lighting body 625 in a manner in which electricity can be communicated. The battery 641 is adapted to be a dry battery or a rechargeable battery. The arrangement position of the battery 641 is not limited by this application. For example, the battery 641 is adapted to be arranged in the barrel part 6110 or in the gripping part 6120. The battery 641 can adjust the center of gravity of the focus adjustable pistol type spotlight 6100, when the battery 641 is arranged on the gripping part 6120, because the light source assembly 620 and the lens assembly 630 are installed at the end of the barrel part 6110, the center of the focus adjustable pistol type spotlight 6100 is closer to the middle position.

For example, a base having a containing space can also be arranged at the end of the gripping part 6120, and the battery 641 is arranged in the base, the outer diameter of the base can be greater than the outer diameter of the gripping part 6120, so that the focus adjustable pistol type spotlight 6100 can stand up more stably through the base.

In the implementation mode of the present invention, the focus adjustable pistol type spotlight 6100 further comprises a control assembly 650 electrically connected to the lighting body 625 and the power supply component 640. The control assembly 650 comprises a circuit board 651 electrically connected to the lighting body 625 and the electrical connection port 642 and a starting control unit 652 connected to the circuit board 651, wherein the starting control unit 652 is used for controlling the start and close of the lighting body 625 and it can be implemented as a pressing operator, a touch screen operator, a rotating operator, a rocker operator, or any other operators with other types, about this, it is not limited by this application. Optionally, the pneumatic operator is mounted on the gripping part 6120, and is also adapted to be arranged on other parts.

Figure 31:
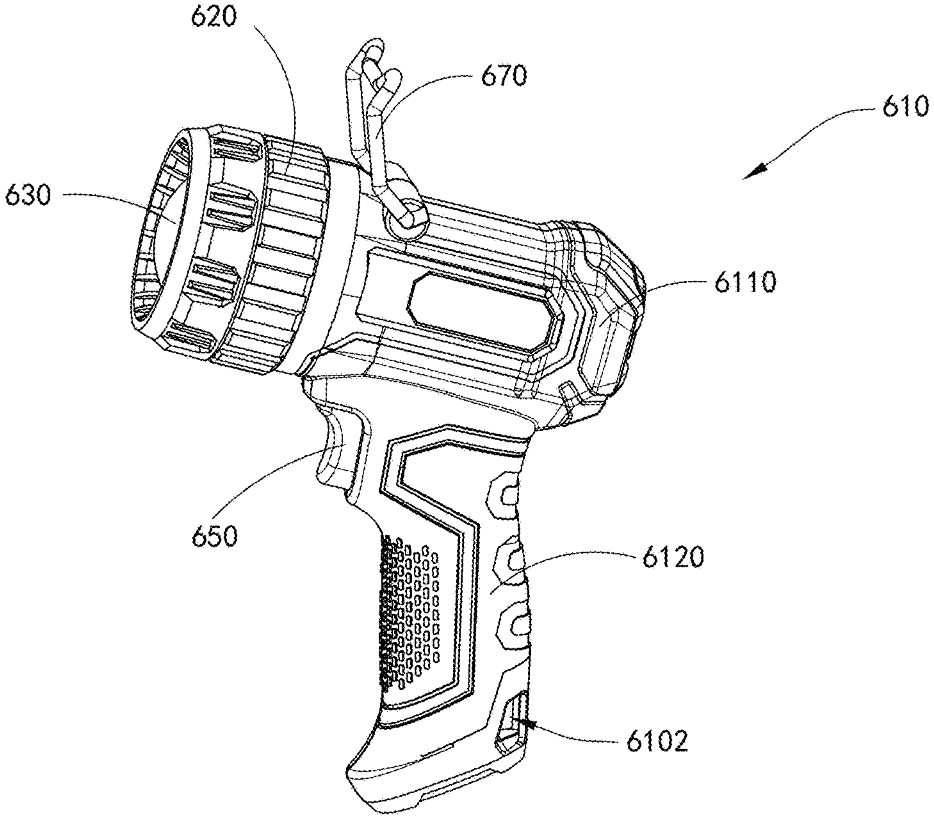
FIG. 31 a schematic view illustrating the focus adjustable handheld spotlight according to the sixth preferred embodiment of this present invention.

The focus adjustable pistol type spotlight 6100 further comprises at least one hanging ring structure 670, so as to facilitate the user to carry or hang the focus adjustable pistol type spotlight 6100 on an external object. In a specific implementation mode of this application, the focus adjustable pistol type spotlight 6100 comprises a hanging ring structure 670 arranged on the barrel part 6110 in a rotatable manner, as shown in FIG. 29 and FIG. 31. The gripping part 6120 is provided with a through hole 6102 penetrating through the outer surfaces of both sides which also forms the hanging ring structure 670.

In summary, the focus adjustable pistol type spotlight 6100 based on the embodiment of this application is illustrated that the movable parts of the focus adjustable pistol type spotlight 6100 have a longer displacement stroke, resulting in a larger length range for focus adjusting.

Referring to the FIGS. 34-43 of the drawings, a swivel hook pistol light 81 according to a seventh preferred embodiment of the present invention is illustrated. The swivel hook pistol light 81 is suitable for providing the output of the light. Compared with the conventional mobile power supply output, the swivel hook pistol light 81 has certain portability and can be hung in the air of a place and cast a stable light source output from above. It can also be fixed to the bottom of an object to cast the stable light output from below. The operator can output the light source by the manner of directly holding the swivel hook pistol light 81, or by the manner of holding the swivel hook pistol light 81 in the air and fixedly supporting the swivel hook pistol light 81.

For illustrative purposes, the upper part of the swivel hook pistol light 81 when held by the user is defined as the top part, and vice versa, as the bottom part. The direction of the output light source of the swivel hook pistol light 81 is defined as the front end, and vice versa, as the back end.

The swivel hook pistol light 81 has three states: a holding state, a hanging state and a supporting state. When the swivel hook pistol light 81 is in the holding state, the user can freely control the output direction of the light source; when the swivel hook pistol light 81 is in the hanging state, the user can hang the swivel hook pistol light 81 in the air of a place, and continuously directed output the light source from the upper part; when the swivel hook pistol light 81 is in the supporting state, the user can fixedly support the swivel hook pistol light 81 at the bottom and continuously directionally output the light source from the lower part. Compared with the conventional mobile power output mode, the swivel hook pistol light 81 has both portability and sustainable irradiation, which can be applied to more application scenarios.

The swivel hook pistol light 81 comprises a main body 810, a handle assembly 820 and a hook assembly 830. The main body 810 provides the function of light source output. The handle assembly 820 provides the function of holding for the user. The handle assembly 820 is integratelly connected to the main body 810. The hook assembly 830 provides the functions of holding and fixedly supporting. The hook assembly 830 is adjustably mounted on the main body 810, and the hook assembly 830 and the handle assembly 820 are located on different sides of the main body 810. To be specific, the handle assembly 820 is located at the bottom part of the main body 810, and the hook assembly 830 is located at the top part of the main body 810.

When the swivel hook pistol light 81 is in the holding state, the hook assembly 830 is close to and attached to the top part of the main body 810, and the user can output the light source by holding the handle assembly 820; when the swivel hook pistol light 81 is in the hanging state, the hook assembly 830 is folded and away from the main body 810, the user is able to hang the swivel hook pistol light 81 in the air through the hook assembly 830 to directionally output the light source from the upper part in a certain period, also the direction of the light source can be adjusted by the rotatability of the hook assembly 830; when the swivel hook pistol light 81 is in the supporting state, the hook assembly 830 is folded over and away from the main body 810, and the user is able to fixedly support the swivel hook pistol light 81 at the bottom through inverting, meanwhile, the top part of the hook assembly 830 and the back end of the main body 810 can directly contact with the bottom for user to support, so as to directly output the light source from the lower part in a certain period, the light source can make sure the output direction of the light source through adjusting the direction of folding over of the hook assembly 830.

The main body 810 comprises a housing 811, a lamp source 812 and a power supply 815. The housing 811 provides a mounting space, and the lamp source 812 and the power supply 815 are installed inside the housing 811. The housing 811 is integrated connected to the handle assembly 820. In this embodiment, the housing 811 and the handle assembly 820 form a shape that tends to be pistol-shaped. Through the shape of the pistol type, the swivel hook pistol light 81 has certain comfort and controllability when it is held. The pistol-type shape formed by the housing 811 and the handle assembly 820 is not limited by the invention.

The housing 811 provides the mounting space for mounting internal components. The lamp source 812 and the power supply 815 are suitable to be installed inside the housing 811. The lamp source 812 is mounted on the front end of the power supply 815. The lamp source 812 is suitable for providing the function of light source output, and the power supply 815 is suitable for providing the function of energy supply. The lamp source 812 is electrically connected to the power supply 815. The power supply 815 is suitable for electrical connection to an external power supply. In this embodiment, the lamp source 812 provides energy directly through the power supply 815. In addition, the power supply 815 in this embodiment optionally implements the function of supplying DC charge to the lamp source 812 and obtaining energy supply by the manner of electrically connecting to the external AC to provide a subsequent power supply function. That is, in this embodiment, the power supply 815 can directly supply the energy for the lamp source 812, or the energy can be stored through the external power supply.

The main body 810 comprises at least one port 816, wherein the port 816 is arranged at the back end of the housing 811 in this embodiment. The port 816 is suitable for providing external energy supply. That is, the operator can supplement the power supply 815 with energy through the port 816. The swivel hook pistol light 81 can be implemented to directly charge for the lamp source 812 through the port 816 while output the light source from the back forward from the front end through the lamp source 812; or it is implemented to reserve electric energy for the power supply 815 through the port 816, so that when going out, there is no AC energy supply around, the light source can be output for a long time through the lamp source 812.

The main body 810 further comprises a lamp shade 813, an outer cover 814 and an installing element 817. The lamp shade 813 is suitable for providing a light convergence function. The lamp shade 813 is mounted inside the housing 811. The lamp shade 813 is arranged at the front end of the lamp source 812 and surrounded the lamp source 812. The lamp shade 813 is gradually shrunk from front to back to achieve the purpose of converging the light beams. The outer cover 814 and the installing element 817 are mounted on the front end of the housing 811. The outer cover 814 also provides a certain light-converging effect. In this embodiment, the outer cover 814 adopts a parabolic curved surface design, which has a certain effect of reducing light loss. The installing element 817 provides a fastening mounting function. The outer cover 814 is mounted on the front end of the housing 811 through the installing element 817. The outer cover 814 is covered at the front end of the lamp shade 813 to play a role of further converging light.

It is worth mentioning that the main body 810 further comprises a connecting element 818. The connecting element 818 provides the function of connecting the hook assembly 830. The connecting element 818 is arranged on the top part of the housing 811. The hook assembly 830 is mounted on the main body 810 through the connecting element 818. Further, the connecting element 818 is located the side near the installing element 817 and the housing 814, that is to say, the connecting element 818 is away from the back-end face of the housing 811.

The handle assembly 820 comprises a holding body 821 and a pressing unit 822, and the holding body 821 is integrated and connected to the rear side of the lower end of the housing 811 in the shape of a pistol handle. The holding body 821 is suitable for being held by the operator, and the pressing unit 822 is mounted on the upper side of the front end of the holding body 821 and is near the bottom of the housing 811. In other words, the pressing unit 822 is located between the main body 810 and the handle assembly 820. The front-end face of the holding body 821 is provided with multiple stripes in the manufacturing process, so as to increase the friction with the finger while the operator holds, facilitate holding, avoid falling, and increase the certain comfort while holding. The pressing unit 822 is movably arranged on the holding body 821 to provide the switching of light source state of the swivel hook pistol light 81. That is to say, the pressing unit 822 controls the light source output of the lamp source 812. In other words, the operator realizes the open and close of the lamp source 812 by pressing the pressing unit 822 to achieve autonomous control.

The hook assembly 830 is installed on the top end of the main body 810, through the state change of the hook assembly 830, achieve the different hanging modes. In other words, through the state change of the hook assembly 830 on the top end of the main body 810, the light emitted by the main body 810 can be exported in an adjustable manner to achieve the desired purpose of the directed continuous output light source in different angles.

In particular, the hook assembly 830 comprises a folding member 831, a rotating member 832 and a hanging member 833, wherein the folding member 831, the rotating member 832 and the hanging member 833 are mounted on the top end of the main body 810. Further, the folding member 831 can be connected to the connecting element 818 in a foldable manner. The rotating member 832 is rotatably connected to the folding member 831. One end of the hanging member 833 is connected to the rotating member 832 in a foldable manner, and the other end is installed on the rotating member 832 in a clippable manner.

In this embodiment, the folding member 831 is mounted on both sides of the connecting element 818 to achieve the folding function. When the swivel hook pistol light 81 is switched from the holding state to the hanging state, the folding member 831 is switched from a position near the top surface of the housing 811 to a position away from the top surface of the housing 811. That is to say, the folding member 831 can be folded over the top surface of the housing 811. In this embodiment, the range of the folding angle of the folding member 831 is from 0° to 90°. That is to say, in this embodiment, when the folding member 831 is perpendicular to the top face of the housing 811, it reaches the maximum folding angle of the folding member 831. When the swivel hook pistol light 81 is suspended in the air, the front-end direction of the main body 810 can have the change of turning up and down through the folding member 831. That is to say, the swivel hook pistol light 81 realizes the purpose of adjusting the output angle of the light source through the folding member 831.

The rotating member 832 is adapted to provide the function that the swivel hook pistol light 81 is adapted to be rotated after being hung. In the present embodiment, the rotating member 832 can implement rotation angles ranging from 0° to 360°. That is to say, the rotating member 832 can perform an in-plane rotation along the folding member 831. When the swivel hook pistol light 81 is suspended in the air, the front-end orientation of the main body 810 is rotationally changed by the rotating member 832. In other words, the swivel hook pistol light 81 realizes the purpose of adjusting the output direction of the light source through the rotating member 832.

The hanging member 833 is adapted to provide the function of hanging and fixedly supporting for the swivel hook pistol light 81. That is to say, the swivel hook pistol light 81 is adapted to be suspended in the air through the hanging member 833 to provide the light source output from the upper part. The swivel hook pistol light 81 is also adapted to be fixedly supported at the bottom through the hanging member 833 to provide the light source output from the lower part.

Further, the hanging member 833 comprises a fixing end 8331 and a clipping end 8332 and has at least one hanging slot 8333. The fixing end 8331 provides a function of the fixedly installation. The hanging member 833 is fixedly mounted on the rotating member 832 through the fixing end 8331. The fixing end 8331 is foldably connected to the rotating member 832. The clipping end 8332 provides the function of clipping and buckling. The hanging member 833 is detachably mounted on the rotating member 832 through the clipping end 8332. The hanging member 833 is adapted to be away from the rotating member 832 through one side of the clipping end 8332. The hanging member 833 is suitable for providing the hanging function. In this embodiment, the number of the hanging slots 8333 can be two. The swivel hook pistol light 81 can be inverted through the hanging slot 8333, and offset to the support plane through the hanging member 833 and the housing 811 to achieve the purpose of fixedly supporting. Thus, the hanging slots 8333 provided on both sides have the best fixing effect, but the number of the hanging slots 8333 is not limited by this invention when the swivel hook pistol light 81 is suspended in the air.

The rotating member 832 has a fixing groove 8321 and a clipping groove 8322, and the fixing groove 8321 and the clipping groove 8322 are formed on both sides of the rotating member 832. The fixing end 8331 of the hanging member 833 is installed in the fixing groove 8321 in a manner which is adapted to be foldable, and the clipping end 8332 of the hanging member 833 is detachably engaged in the clipping groove 8322. In the present embodiment, the swivel hook pistol light 81 is implemented in two hanging modes. Firstly, the clipping end 8332 and the fixing end 8331 of the hanging member 833 are respectively completely fixed in the clipping groove 8322 and the fixing groove 8321 of the rotating member 832. The swivel hook pistol light 81 is completed to be suspended in the air through the gap between the hanging member 833 and the rotating member 832. Secondly, the clipping end 8332 of the hanging member 833 is fixed and folded in the fixing groove 8321, and the clipping end is detached from the clipping groove 8322. The swivel hook pistol light 81 can be suspended in the air through the gap between the clipping groove 8333 and the clipping end 8332 in the hanging member 833.

Figure 37:
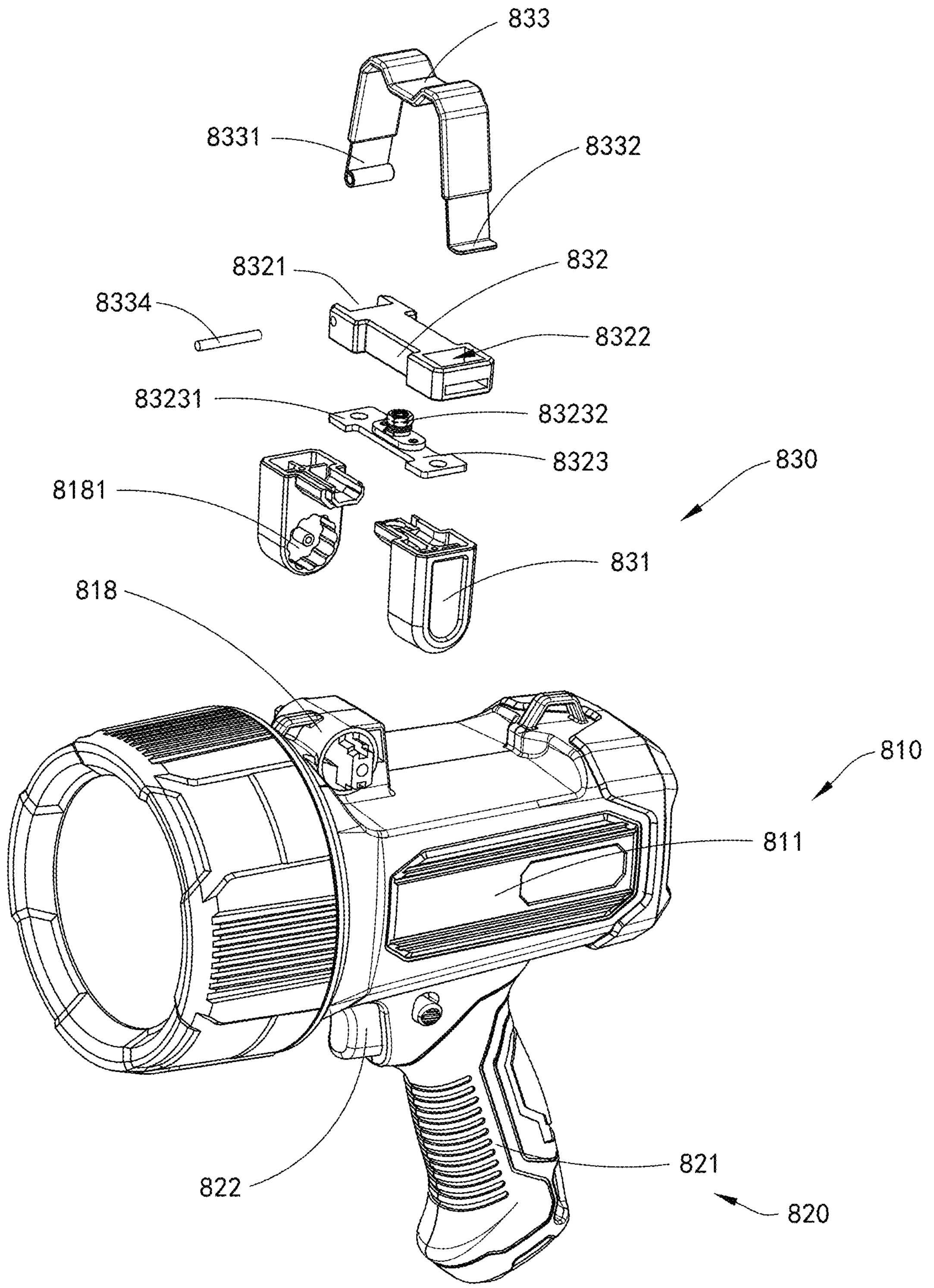
FIG. 37 is an exploded view of a hook assembly of the swivel hook handheld light according to the seventh preferred embodiment of the present invention.
Figure 38:
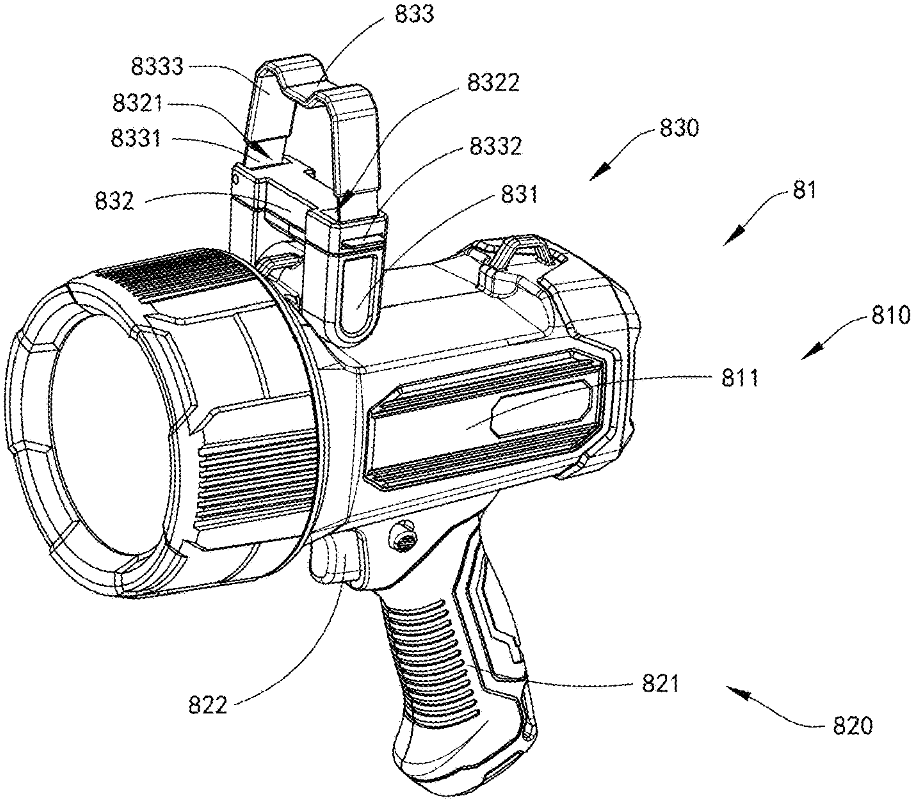
FIG. 38 is a first schematic view illustrating an adjustment state of the hook assembly of the swivel hook handheld light according to the seventh preferred embodiment of the present invention.
Figure 39:
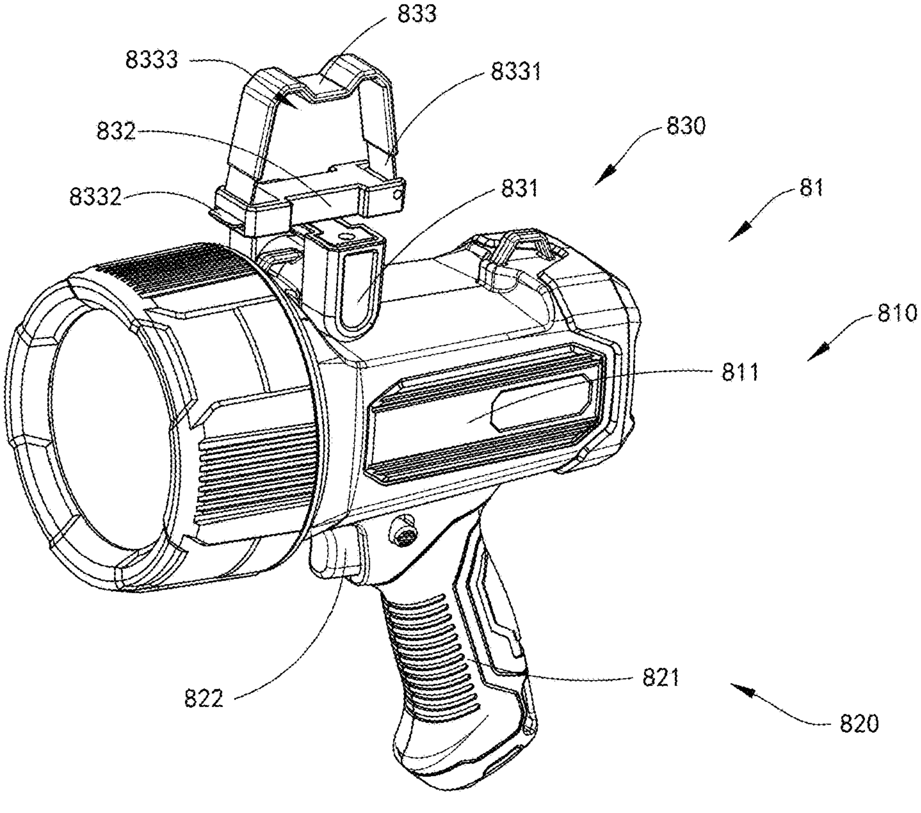
FIG. 39 is a second schematic view illustrating another adjustment state of the hook assembly of the swivel hook handheld light according to the seventh preferred embodiment of the present invention.
Figure 40:
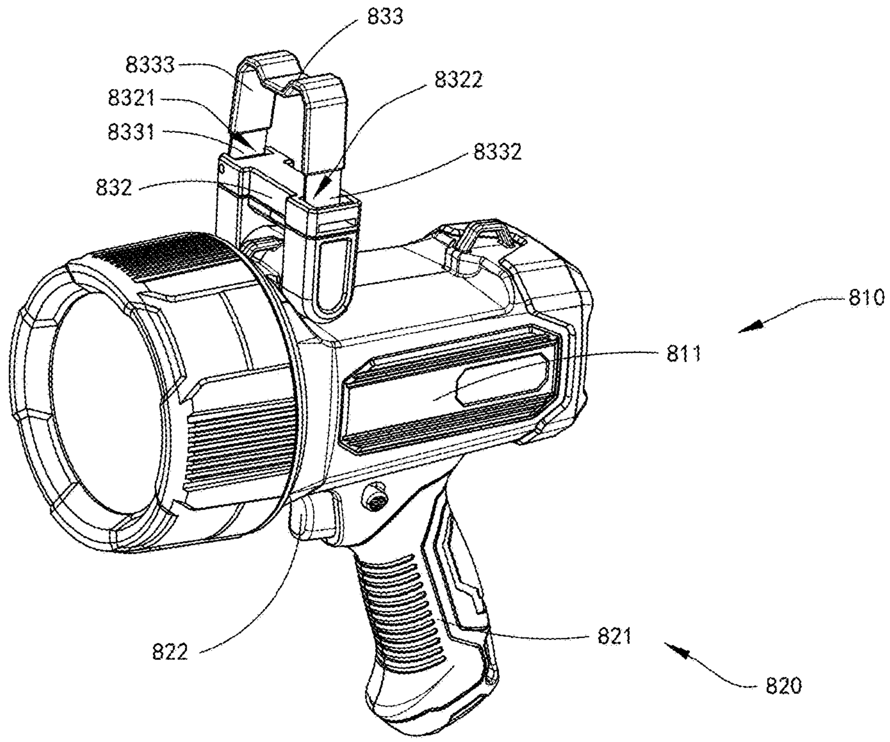
FIG. 40 is a schematic view illustrating a pressing direction of the hook assembly of the swivel hook handheld light according to the seventh preferred embodiment of the present invention.
Figure 41:
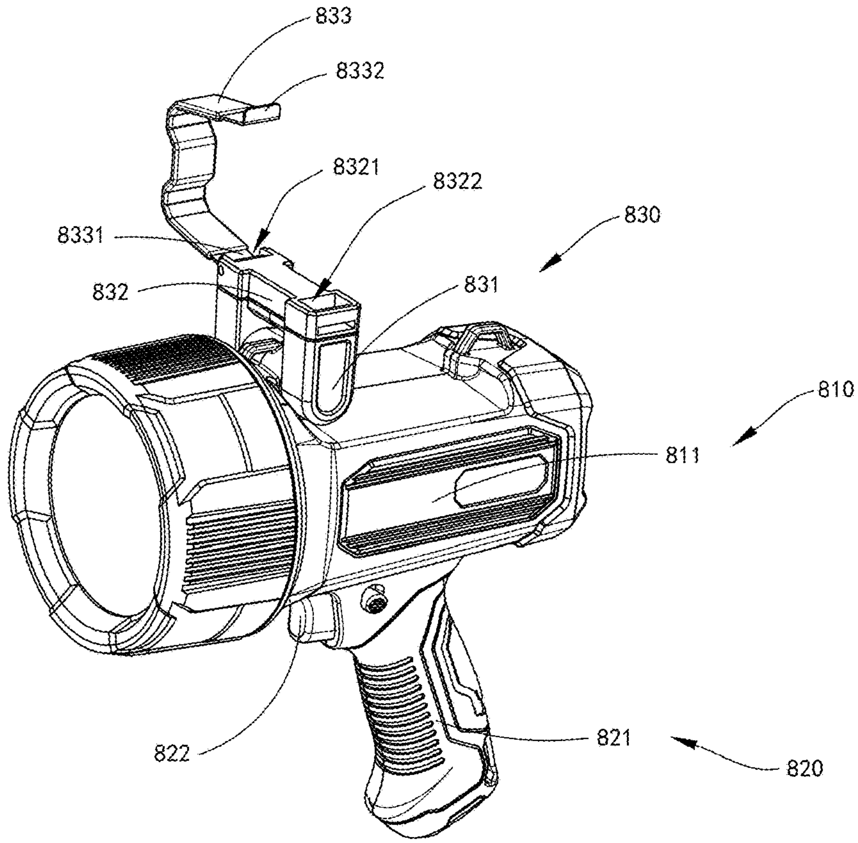
FIG. 41 is a third schematic view illustrating another adjustment state of the hook assembly of the swivel hook handheld light according to the seventh preferred embodiment of the present invention.
Figure 42:
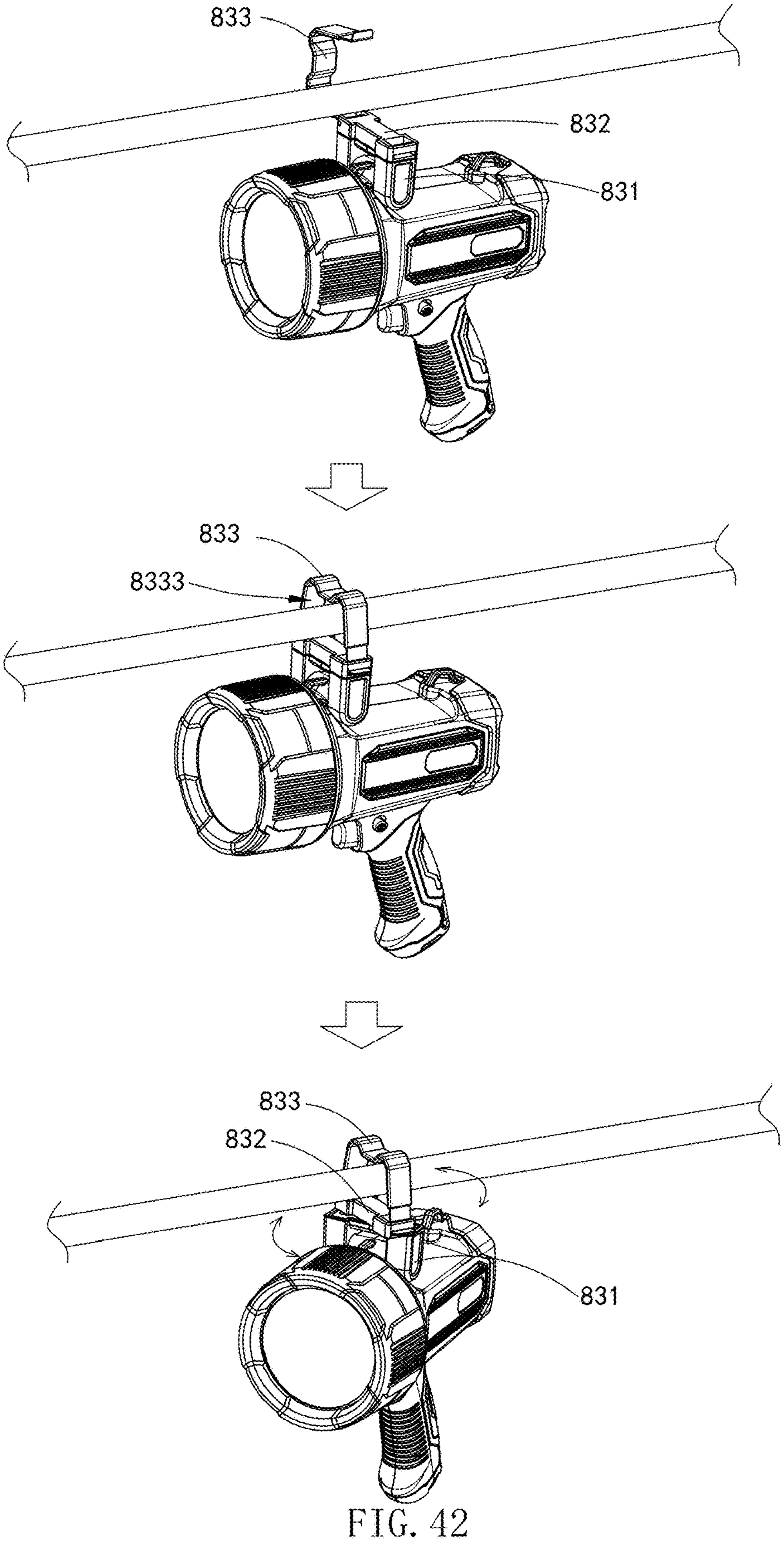
FIG. 42 is a schematic view illustrating a use scenario of a swivel state of the swivel hook handheld light which is hooked on an item according to the seventh preferred embodiment of the present invention.
Figure 43:
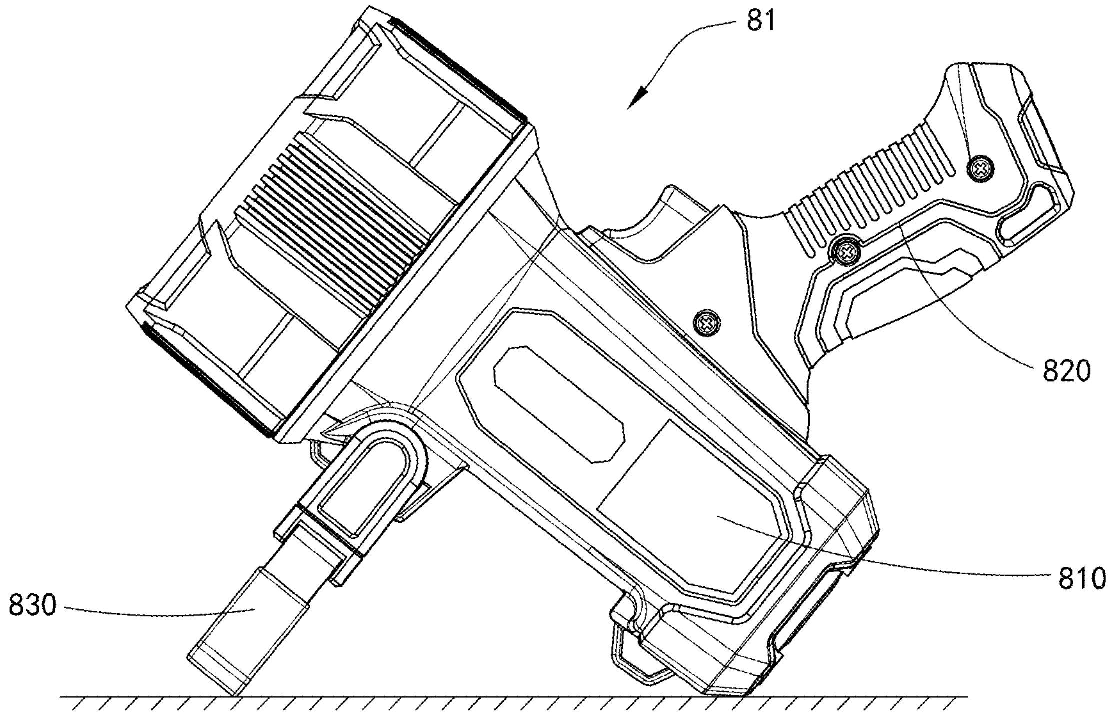
FIG. 43 is a schematic view illustrating a use scenario of the hook assembly of the swivel hook handheld light for supporting and fixing which is hooked on an item according to the seventh preferred embodiment of the present invention.
Figure 44:
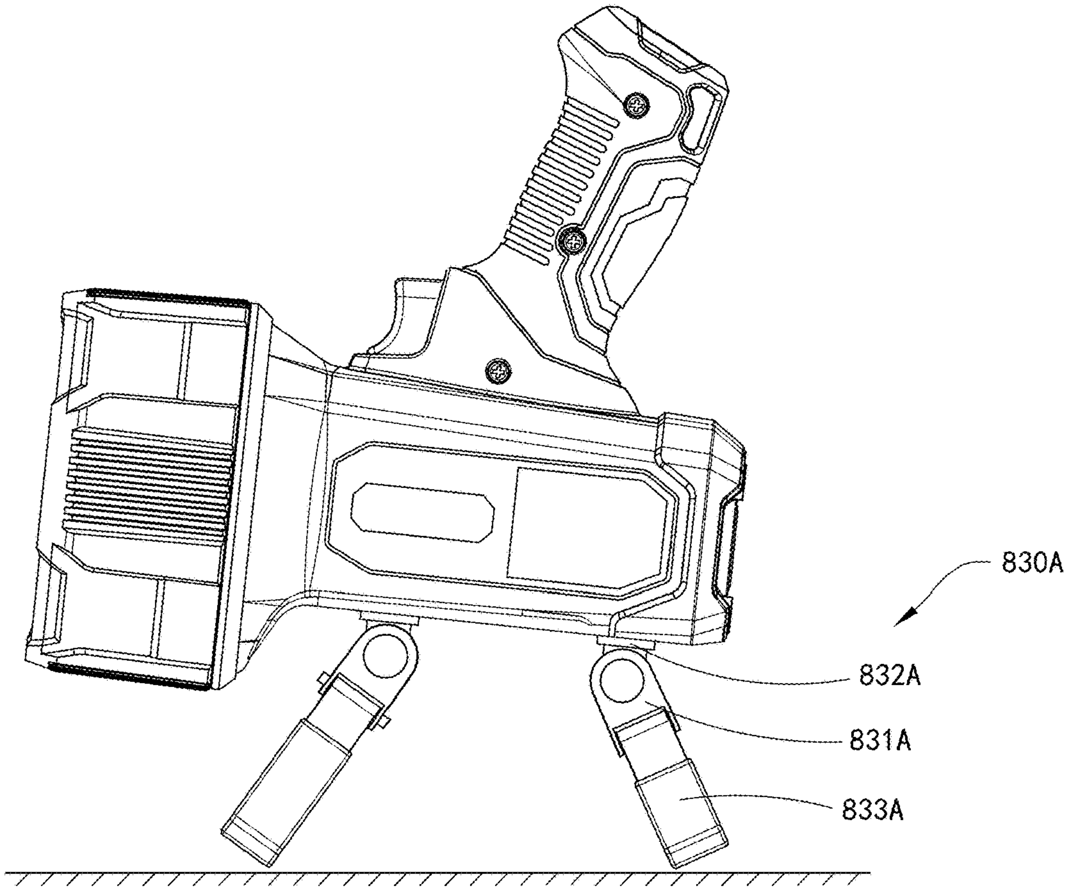
FIG. 44 is a schematic view illustrating a use scenario of a hook assembly of the swivel hook handheld light for supporting and fixing which is hooked on an item according to an eighth preferred embodiment of the present invention.
Figure 45:
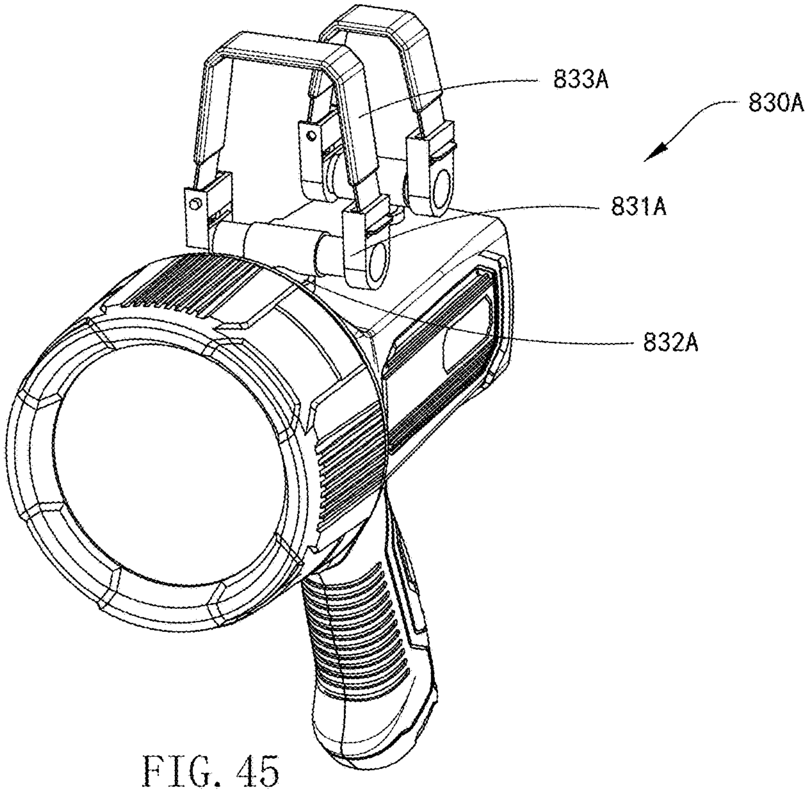
FIG. 45 is an overall schematic view of the swivel hook handheld light according to the eighth preferred embodiment of the present invention.

Referring to the FIG. 37 of the drawing, an exploded view of the hook assembly 830 is illustrated. The folding member 831 is connected with the connecting element 818 in a manner which is adapted to be foldable. In this embodiment, the folding members 831 are implemented to be distributed symmetrically on the both sides of the connecting element 818. The inside of the each folding member 831 is arranged with a locking groove 8181, wherein the inside of the locking groove 8181 can contain the two sides of the connecting element 818. The connecting element 818 is implemented to have two sides matched with the protruding shape of the locking groove 8181 in this embodiment. That is to say, the locking groove 8181 is adapted to be locked with two protruding ends of the connecting element 818.

In particular, when the locking groove 8181 is locked with both sides of the connecting element 818, the locking groove 8181 has the multistage locking performance, in other words, when adjusting the folding member 831, the folding member 831 can be adjusted to be locked with both sides of the connecting elements 818 through the locking groove 8181, so as to show the top surface of the folding member 831 away from the housing 811 in different angles. When the folding member 831 is put away from the top surface of the housing 811, the folding member 831 is adapted to be stably fixed at any angle, that is, the angle at which the folding member 831 is away from the top surface of the housing 811 can be temporarily fixed. Through the connection between the locking groove 8181 and the protrusion at two sides of the connecting elements 818, the folding member 831 can be stably connected after adjusting angles relative to the housing 811. In other words, the operator can change the distance between the folding member 831 and the top surface of the housing 811 by adjusting the fixing angle, meanwhile, through the temporarily fixing between the locking groove 8181 and the protrusion at two sides of the connecting elements 818, so as to make it have a certain safety during use, and make that the deviation of the folding member 831 will not easily occur due to the change of angle, so as to stably retain the distance between the folding member 831 and the top surface of the housing 811, so that it avoids the deviation of the output angle of the light source emitted by the main body 810 of the light due to the action of external force.

In particular, a component between the folding member 831 and the rotating member 832 is implemented to be a specific rotation unit 8323 in this embodiment, the rotation unit 8323 is adapted to be installed on the top part of the folding member 831 in a lockable manner. Further, each top part of the folding member 831 is arranged with a groove for installing an end of the rotation unit 8323. In other words, two ends of the rotation unit 8323 can be engaged with the grooves on top of the folding member 831, so that through the rotation unit 8323, the folding member 831 distributed on both sides of the connecting elements 818 is tend to be a whole structure, and thus the rotation unit 8323 is used to completes the interconnection. In this embodiment, the rotation unit 8323 comprises a bottom plate 83231 and two cylindrical units 83232 extended on both sides of the bottom plate 83231 for self rotation. When the rotating unit 8323 is installed on the rotating member 832, the cylindrical unit 83232 is located in a cavity positioned at the bottom of the rotating member 832. When the hook assembly 830 is required to provide a rotatable function, the rotating member 832 and the cylindrical unit 83232 at the top part of the rotating unit 8323 perform the rotation. The cylindrical unit 83232 and the rotating member 832 can be rotated from 0° to 360° along the upper end of the bottom plate 83231, that is, the arrangement direction of both sides of the rotating member 832 can be inconsistent with the arrangement direction of both sides of the bottom plate 83231.

It is worth mentioning that when the swivel hook pistol light 81 is switched from one holding state to another holding state, the operator can detach the clipping end 8332 from the clipping groove 8322 by pressing the clipping end 8332, so as to make the clipping end 8332 away from the rotating member 832 and the fixing end 8331 be folded in the fixing groove 8321.

In the present embodiment, the fixing groove 8321 is set with the through hole penetrating through two sides therein, convenient for the passing of a fixing rod 8334, to make the hanging member 833 be fixed in the rotating member 832. To be specific, the fixing rod 8334 is implemented as a bolt in this embodiment, and the end of the fixing end 8331 is provided with a through hole allowing a cylinder to pass through, and the through hole allows the fixing rod 8334 to pass through and be fixed, and when the fixing rod 8334 is maintained fixed, the fixing rod 8334 is passed through the through hole at one side of the fixing groove 8321 in turn to penetrate through the fixing end 8331, and finally completes the fixing through passing through the through hole at the other side of the fixing groove 8321.

Because of the shape of the fixing rod 8334, when the hanging member 833 is installed on the rotating member 832, it can provide a certain angle of folding and rotating function, that is, when one side of the hanging member 833 is installed on the rotating member 832, the other side can be folded away from the rotating member 832. According to the shape of an item to be hung by the swivel hook pistol light 81 to change the hanging state of the hook assembly 830, in such a manner to be adapted to different items to be hung.

When the swivel hook pistol light 81 is in the supporting state, the hanging member 833 is positioned at the lower end of the main body 810 by inverting the swivel hook pistol light 81. The hanging member 833 and the back end of the housing 811 are directly in contact and placed on the plane to achieve support fixation. The light source output direction of the swivel hook pistol light 81 is adjusted by changing the angle of the folding member 831.

It is worth mentioning that because of the mounting position of the connecting element 818, when the swivel hook pistol light 81 is in the supporting state, the top part of the hanger member 833 of the inverted hook assembly 830 and the back end of the housing 811 are directly in contact with the placing plane. The mounting position of the connecting element 818 provides a folding range of the hook assembly 830, and when the swivel hook pistol light 81 is in the supporting state, the front end of the hook assembly 830 provides a more stable light source output than the back end, that is, an oriented output light source from bottom to up. In the manufacturing process of the housing 811, a chamfer can be arranged between the back-end face of the housing 811 and the top surface, so that when the swivel hook pistol light 81 is in the supporting state, the chamfer is parallel to the placing plane to make that the swivel hook pistol light 81 has stronger stability during the placing process.

Referring to the FIGS. 40-44 of the drawings, a swivel hook pistol light 81 according to an eighth preferred embodiment of the present invention is illustrated. Compared with the above first embodiment, the major change of the swivel hook pistol light 81 is taken place on the deformation of a hook assembly 830A.

In this embodiment, the hook assembly 830A comprises a pair of folding members 831A, a pair of rotating members 832A and a pair of hanging members 833A. The folding members 831A provide the function of turning over, the rotating members 832A provide the rotating function, and the hanging members 833A provide the function of hanging in the air and the fixedly supporting function. In this embodiment, the rotating members 832A are rotatably mounted on the top end of the main body 810, and the folding members 831A are connected to the rotating member 832A in a manner which can fold. The hanging member 833A is connected to the folding member 831A.

It is worth mentioning that the implementation size of the hook assembly 830A in this embodiment is one large and one small, and in particular, the hanging members 833A have a size difference. When the swivel hook pistol light is in the holding state, the hanging member 833A with the larger volume can be covered on the hanging member 833A with the smaller volume, at the same time, the hanging members 833A are all close to and fitted to the top part of the main body 810.

When the swivel hook pistol light is in the hanging state, the function of suspending in the air can be realized by passing through the gap of the hanging members 833A. When the swivel hook pistol light is in the supporting state, the pair of the hanging members 833A can be directly contacted with the placing plane by folding the hanging member 833A to achieve the purpose of maintaining the main body 810 being close to the placing plane, so as to stabilize the light output of the swivel hook pistol light. It should be noted that in the devices and methods of the present application, the components or steps in different embodiments can be disassembled and/or recombined without deviating from the principles of the present invention. Such decomposition and/or recombination shall be deemed to be included in the invention concepts of this application.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A focus adjustable pistol type spotlight, comprising:

a mounting main housing having a pistol shaped structure and at least one receiving cavity located therein;

a light source assembly comprising at least one lighting subject body; and a lens assembly, located on the exit path of said light source assembly, comprising at least one lens, wherein at least one of said lighting subject bodies is mounted on said mounting main housing along an optical axis of said light source assembly in a movable manner such that said at least one of said lighting subject bodies moves relative to said lens assembly;

wherein said light source assembly comprises a driving inner cone, and a driving outer cone covered outside said driving inner cone, said lighting subject body is installed on said driving inner cone, and said driving inner cone is mounted on said driving outer cone along the optical axis of said light source assembly in a movable manner;

wherein said driving inner cone has an external thread located on a surface thereof, and said driving outer cone has an internal thread located on an inner wall thereof to enable said driving inner cone to move within said driving outer cone, so as to carry said lighting subject body moving relative to said lens assembly.

2. The focus adjustable pistol type spotlight, as recited in any one claim 1, wherein said light source assembly further comprises a guiding member mounted on said driving inner cone for guiding said driving inner cone to move along the optical axis set by said light source assembly.

3. The focus adjustable pistol type spotlight, as recited in claim 2, wherein said light source assembly further comprises a guiding inner cone covered outside said driving inner cone, said driving inner cone comprises an inner cone body and at least one fixed protrusion formed on the outer surface of said inner cone body; said guiding inner cone has at least one guiding groove corresponding to said fixed protrusion, and said extension direction of at least part of said guiding groove is consistent with the optical axis set by said light source assembly, and said fixed protrusion can be arranged in said guiding groove in a slidable manner.

4. The focus adjustable pistol type spotlight, as recited in claim 3, wherein said external thread of said driving inner cone is formed on an outer surface of said fixed protrusion.

5. The focus adjustable pistol type spotlight, as recited in claim 4, wherein said light source assembly further comprises an operating sleeve, a light source mounting body and an optical bowl, said operating sleeve is covered outside said driving outer cone, said light source mounting body is installed in said driving inner cone, said lighting subject body is installed in said light source mounting body and extended out of said driving inner cone; said optical bowl is covered outside the periphery of said lighting subject body.

6. The focus adjustable pistol type spotlight, as recited in claim 3, wherein said driving inner cone comprises a plurality of fixed protrusions arranged with respect to each other in a spaced manner, and the plurality of said guiding inner cone have the plurality of said guiding groove corresponding to the plurality of fixed protrusion.

7. The focus adjustable pistol type spotlight, as recited in claim 1, wherein said driving outer cone is mounted on said mounting main housing in a rotatable manner along the optical axis of said light source assembly, and said driving outer cone is immovable in the direction of the optical axis of said light source assembly so that during the process of being rotated of said driving outer cone, said driving inner cone is moved along the optical axis of said light source assembly in said driving outer cone and drives said lighting subject body to move relative to said lens assembly.

8. A focus adjustable pistol type spotlight, comprising:

a mounting main housing having a pistol shaped structure and at least one receiving cavity located therein;

a light source assembly comprising at least one lighting subject body; and a lens assembly, located on the exit path of said light source assembly, comprising at least one lens, wherein at least one of said lighting subject bodies is mounted on said mounting main housing along an optical axis of said light source assembly in a movable manner such that said at least one of said lighting subject bodies moves relative to said lens assembly;

wherein said light source assembly comprises a driving inner cone, and a driving outer cone covered outside said driving inner cone, said lighting subject body is installed on said driving inner cone, and said driving inner cone is mounted on said driving outer cone along the optical axis of said light source assembly in a movable manner wherein said light source assembly further comprises a guiding member mounted on said driving inner cone for guiding said driving inner cone to move along the optical axis set by said light source assembly;

wherein said light source assembly further comprises a guiding inner cone covered outside said driving inner cone, said driving inner cone comprises an inner cone body and at least one fixed protrusion formed on the outer surface of said inner cone body; said guiding inner cone has at least one guiding groove corresponding to said fixed protrusion, and said extension direction of at least part of said guiding groove is consistent with the optical axis set by said light source assembly, and said fixed protrusion can be arranged in said guiding groove in a slidable manner.

9. The focus adjustable pistol type spotlight, as recited in claim 8, wherein said driving inner cone comprises a plurality of fixed protrusions arranged with respect to each other in a spaced manner, and the plurality of said guiding inner cone have the plurality of said guiding groove corresponding to the plurality of fixed protrusion.

10. The focus adjustable pistol type spotlight, as recited in claim 8, wherein said external thread of said driving inner cone is formed on an outer surface of said fixed protrusion.

11. The focus adjustable pistol type spotlight, as recited in claim 8, wherein said light source assembly further comprises an operating sleeve, a light source mounting body and an optical bowl, said operating sleeve is covered outside said driving outer cone, said light source mounting body is installed in said driving inner cone, said lighting subject body is installed in said light source mounting body and extended out of said driving inner cone; said optical bowl is covered outside the periphery of said lighting subject body.

12. A focus adjustable pistol type spotlight, comprising:

a mounting main housing having a pistol shaped structure and at least one receiving cavity located therein;

a light source assembly comprising at least one lighting subject body; and a lens assembly, located on the exit path of said light source assembly, comprising at least one lens, wherein at least one of said lighting subject bodies is mounted on said mounting main housing along an optical axis of said light source assembly in a movable manner such that said at least one of said lighting subject bodies moves relative to said lens assembly;

wherein said light source assembly comprises a driving inner cone, and a driving outer cone covered outside said driving inner cone, said lighting subject body is installed on said driving inner cone, and said driving inner cone is mounted on said driving outer cone along the optical axis of said light source assembly in a movable manner;

wherein said light source assembly further comprises an operating sleeve, a light source mounting body and an optical bowl, said operating sleeve is covered outside said driving outer cone, said light source mounting body is installed in said driving inner cone, said lighting subject body is installed in said light source mounting body and extended out of said driving inner cone; said optical bowl is covered outside the periphery of said lighting subject body.

* * * * *